United States Patent
Sharma et al.

(10) Patent No.: US 11,803,291 B2
(45) Date of Patent: Oct. 31, 2023

(54) METHOD OF DISPLAYING WEB PAGES AND BROWSER DISPLAY SYSTEM

(71) Applicant: SAMSUNG ELECTRONICS CO., LTD., Suwon-si (KR)

(72) Inventors: Anuj Kumar Sharma, Bulandshahr (IN); Pritam Rajendra Nikam, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/557,942

(22) Filed: Dec. 21, 2021

(65) Prior Publication Data

US 2022/0269384 A1  Aug. 25, 2022

Related U.S. Application Data

(63) Continuation of application No. PCT/KR2021/019316, filed on Dec. 17, 2021.

(30) Foreign Application Priority Data

Feb. 23, 2021 (IN) .............................. 202141007571
Jul. 29, 2021 (KR) ........................ 10-2021-0100190

(51) Int. Cl.
*G06F 3/00* (2006.01)
*G06F 3/0483* (2013.01)
*G06F 16/957* (2019.01)
*G06F 3/0484* (2022.01)
*G06F 16/9535* (2019.01)

(52) U.S. Cl.
CPC .......... *G06F 3/0483* (2013.01); *G06F 3/0484* (2013.01); *G06F 16/9535* (2019.01); *G06F 16/9577* (2019.01); *G06F 2203/04803* (2013.01)

(58) Field of Classification Search
CPC ............... G06F 3/0483; G06F 16/9577; G06F 16/9535; G06F 3/0484; G06F 2203/04803
USPC ................................................... 715/747, 234
See application file for complete search history.

(56) References Cited

U.S. PATENT DOCUMENTS

| 8,095,888 | B2 * | 1/2012 | Jang ...................... G06F 1/1686 715/815 |
| 9,483,444 | B2 | 11/2016 | Ying et al. |
| 9,740,794 | B2 * | 8/2017 | Bhumkar ............ G06F 16/9038 |

(Continued)

FOREIGN PATENT DOCUMENTS

KR  10-2020-0089123 A  7/2020

OTHER PUBLICATIONS

John Anderson, How to Use Stylebot to Manipulate CSS on the Fly, published Dec. 18, 2017 via wpzone.co, pp. 1-19 (pdf).*

(Continued)

*Primary Examiner* — Manglesh M Patel
(74) *Attorney, Agent, or Firm* — Sughrue Mion, PLLC

(57) ABSTRACT

A method of displaying web pages, capable of using the same settings for all web pages, is provided. The method includes receiving a user request for opening a web page; selecting, from among a plurality of views, a view in which the web page is to be opened, based on metadata corresponding to the web page, wherein each view of the plurality of views has a corresponding set of viewing properties; and displaying the web page in a browser window based on the corresponding set of viewing properties of the selected view.

15 Claims, 19 Drawing Sheets

Layout 5

(56) References Cited

U.S. PATENT DOCUMENTS

| | | | |
|---|---|---|---|
| 9,971,468 B2* | 5/2018 | Ryall | G06F 40/166 |
| 10,783,214 B1* | 9/2020 | Rowe | G06F 16/904 |
| 10,963,271 B2* | 3/2021 | Forsberg | G06F 9/451 |
| 11,295,321 B2 | 4/2022 | Patterson et al. | |
| 11,334,224 B2 | 5/2022 | Boyd et al. | |
| 2002/0063735 A1 | 5/2002 | Tamir et al. | |
| 2003/0025732 A1* | 2/2003 | Prichard | G06F 8/38 |
| | | | 715/765 |
| 2006/0143568 A1* | 6/2006 | Milener | G06F 16/957 |
| | | | 715/764 |
| 2008/0091839 A1 | 4/2008 | Mitchell et al. | |
| 2009/0327953 A1* | 12/2009 | Honkala | G06F 3/04817 |
| | | | 715/804 |
| 2014/0344666 A1* | 11/2014 | Bleakley | G06F 16/9574 |
| | | | 715/234 |
| 2016/0085514 A1 | 3/2016 | Savliwala et al. | |
| 2020/0257877 A1 | 8/2020 | Siu et al. | |

OTHER PUBLICATIONS

International Search Report (PCT/ISA/210) dated Apr. 8, 2022 issued by the International Search Authority in International Application No. PCT/KR2021/019316.

* cited by examiner

Layout 1

Layout 2

Layout 3

Layout 4

Layout 5

Smart Tv

Foldable Phone

REFRIGERATOR

Flip Phone

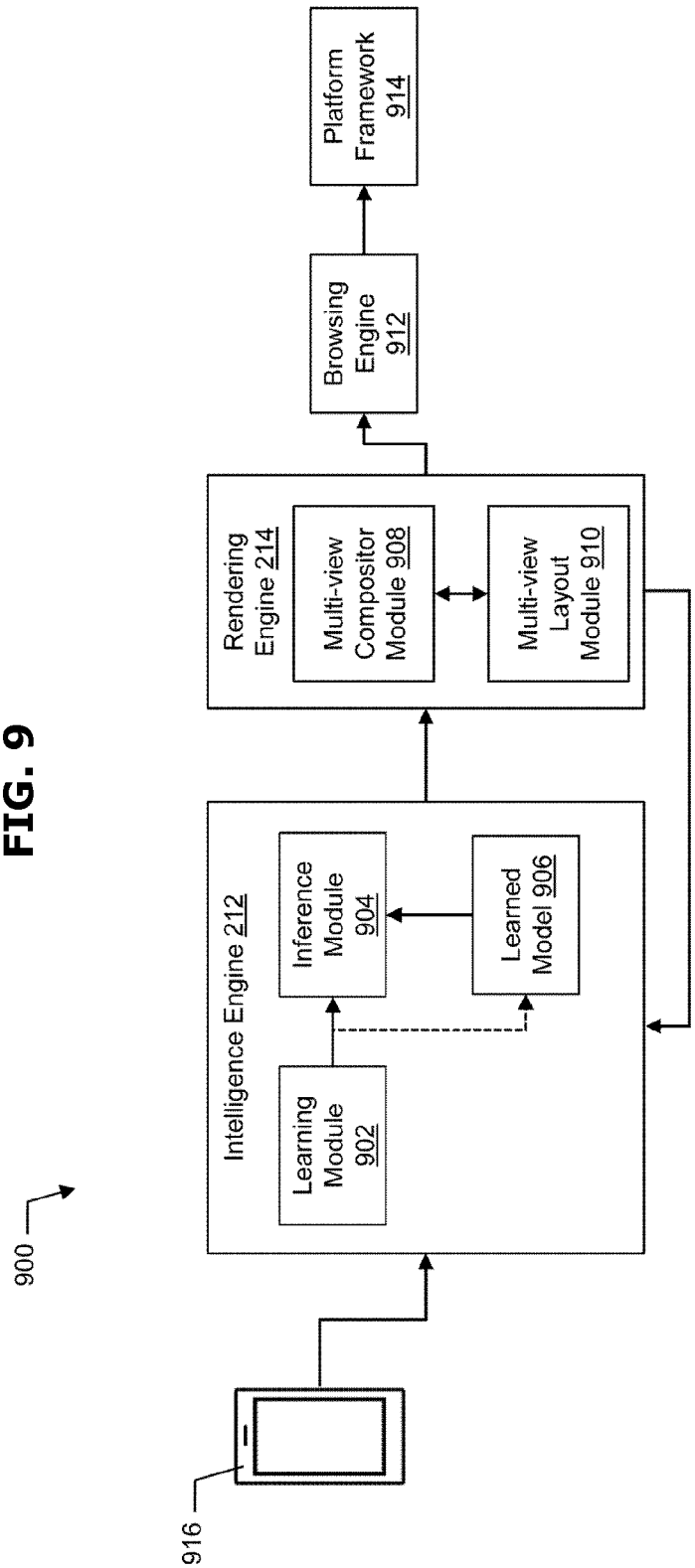

METHOD OF DISPLAYING WEB PAGES AND BROWSER DISPLAY SYSTEM

CROSS-REFERENCE TO RELATED APPLICATION(S)

This application is a bypass continuation application of International Application No. PCT/KR2021/019316, filed on Dec. 17, 2021, which is based on and claims priority to Indian Patent Application No. 202141007571, filed on Feb. 23, 2021, in the Indian Patent Office, and Korean Patent Application No. 10-2021-0100190, filed on Jul. 29, 2021, in the Korean Intellectual Property Office, the disclosures of which are incorporated by reference herein in their entireties.

BACKGROUND

1. Field

The disclosure generally relate to a user interface in a web browsing application, and more particularly, relates to a user interface based on multiple web-views in a web browsing application.

2. Description of the Related Art

A web browser is one of the most commonly used applications on smartphones, tablets, laptops etc. With the recent advancement in a display industry, users are more inclined towards large size screens. However, with the web-browsing limitations in the related art, users are not able to utilize complete screens especially when using tablets, smart TVs, etc.

Some of the additional limitations in the related art web-browsers include that the users are restricted to use same web-browser settings for all the web-pages. Furthermore, management of multiple accounts on the same domain in the same web-browser is confusing and not easy. Furthermore, swapping between the tabs and web-pages is time consuming. Thus, the currently available browsers provide limited scalability and the user experience is degraded.

SUMMARY

Provided are a method of displaying web pages and a browser display system capable of using the same settings for all web pages.

Further, provided are a method of displaying web pages and a browser display system that facilitate the management of multiple accounts for the same domain within the same web browser.

Further still, provided are a method of displaying web pages and a browser display system that do not require switching web pages for simple tasks.

Additional aspects of the disclosure will be set forth in part in the description which follows and, in part, will be obvious from the description, or may be learned by practice of the disclosure.

According to an aspect of the disclosure, there is provided a method of displaying web pages on a display of an electronic device, the method including receiving a user request for opening a web page; selecting, from among a plurality of views, a view in which the web page is to be opened, based on metadata corresponding to the web page, wherein each view of the plurality of views has a unique set of viewing properties; and displaying the web page in a browser window based on the corresponding set of viewing properties of the selected view.

The method may further include: accessing a personalization database including respective user personalization data corresponding to a plurality of web pages, the respective user personalization data including at least a view preference setting; and based on the determining that user personalization data corresponding to the web page is included in the personalization database, modifying at least one viewing property associated with the browser window based on the view preference setting included in the user personalization data corresponding to the web page.

The method may further include grouping the browser window with another browser window in a same view, based on determining that the another browser window with the same view is currently opened on the display of the electronic device.

The web page may pertain to a first domain, and it may be determined that another web page pertaining to the first domain is currently opened in another browser window, wherein the selecting the view includes selecting, based on determining that a user has logged into the first domain using the another web page using a first user account, the view for the web page such that the selected view is different from a view selected for the another web page; and wherein the displaying the web page includes opening the web page in the browser window in the selected view without using the first user account.

The method may further include: based on determining that at least one other browser window is opened on the display of the electronic device, determining whether it is possible to concurrently display the browser window and the at least one other browser window on the display of the electronic device, based on a size of the display and an orientation of the electronic device; and displaying the browser window and the at least one other browser window concurrently on the display based on a predetermined layout, based on determining that it is possible to concurrently display the browser window and the at least one other browser window on the display of the electronic device.

The method may further include displaying the web page in the browser window based on at least one view property associated with the selected view, based on determining that the at least one view property associated with the selected view contradicts with at least one property of the browser window.

According to an aspect of the disclosure, there is provided, there is provided a Browser Display System (BDS) for displaying web pages on a display of an electronic device, the BDS including a memory; a processor coupled to the memory; and at least one engine coupled to the processor, wherein the at least one engine is configured to: receive a user request for opening a web page in a browser application; and select, from among a plurality of views, a view in which the web page is to be opened, based on metadata corresponding to the web page, wherein each view of the plurality of views has a corresponding set of viewing properties; and display the web page in a browser window of the browser application based on the corresponding set of viewing properties of the selected view.

The at least one engine may be further configured to: access a personalization database including respective user personalization data corresponding to a plurality of web pages, the respective user personalization data including at least a user preference of a view for each of the plurality of web pages; and select the view based on the user preference included in the user personalization data, based on the user personalization data corresponding to the web page being included in the personalization database.

The at least one engine may be further configured to: access a personalization database including respective user personalization data corresponding to a plurality of web pages, the respective user personalization data including at least a view preference setting; and based on user personalization data corresponding to the web page being included in the personalization database, modify one or more viewing properties associated with the browser window based on the view preference setting included in the user personalization data corresponding to the web page.

The at least one engine may be further configured to group the browser window with another browser window in a same view, based on determining that the another browser window with the same view is opened on the display of the electronic device.

The web page may pertain to a first domain, and it may be determined that another web page pertaining to the first domain is currently opened in another browser window, and the at least one engine may be further configured to: select, based on determining that a user has logged into the first domain using the another web page using a first user account, the view for the web page such that the selected view is different from a view selected for the another web page; and open the web page in the browser window in the selected view without using the first user account.

The at least one engine may be further configured to: determine that at least one other browser window is opened on the display of the electronic device, and determine whether it is possible to concurrently display the browser window and the at least one other browser window on the display of the electronic device, based on a size of the display and an orientation of the electronic device; and display the browser window and the at least one other browser window concurrently on the display based on a predetermined layout, based on determining that it is possible to concurrently display the browser window and the at least one other browser window on the display of the electronic device.

The at least one engine may be further configured to displaying the web page in the browser window based on at least one view property associated with the selected view, based on determining that the at least one view property associated with the selected view contradicts with at least one property of the browser window.

The at least one engine may be further configured to: monitor, over time, a web browsing history and a browsing pattern of a user; create a database with a correlation of the monitored web browsing history and pattern of browsing; analyze a layout of the electronic device with reference to multiple corresponding views available in the database for the web page; and select a view for displaying the web page that matches with the layout of the electronic device.

According to an aspect of the disclosure, there is provided a Browser Display System (BDS) for displaying web pages on a display of an electronic device, the BDS including a memory; a processor coupled to the memory; and at least one engine coupled to the processor, wherein the at least one engine is configured to: monitor, over time, a web browsing history and a browsing pattern of a user; create a database with a correlation of the monitored history and pattern of browsing; analyze a layout of the electronic device with reference to multiple corresponding views available in the database for the web page; and select a view for displaying the web page that matches with the layout of the electronic device.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 illustrates a system, according to an embodiment; and

DETAILED DESCRIPTION

Figure 1:
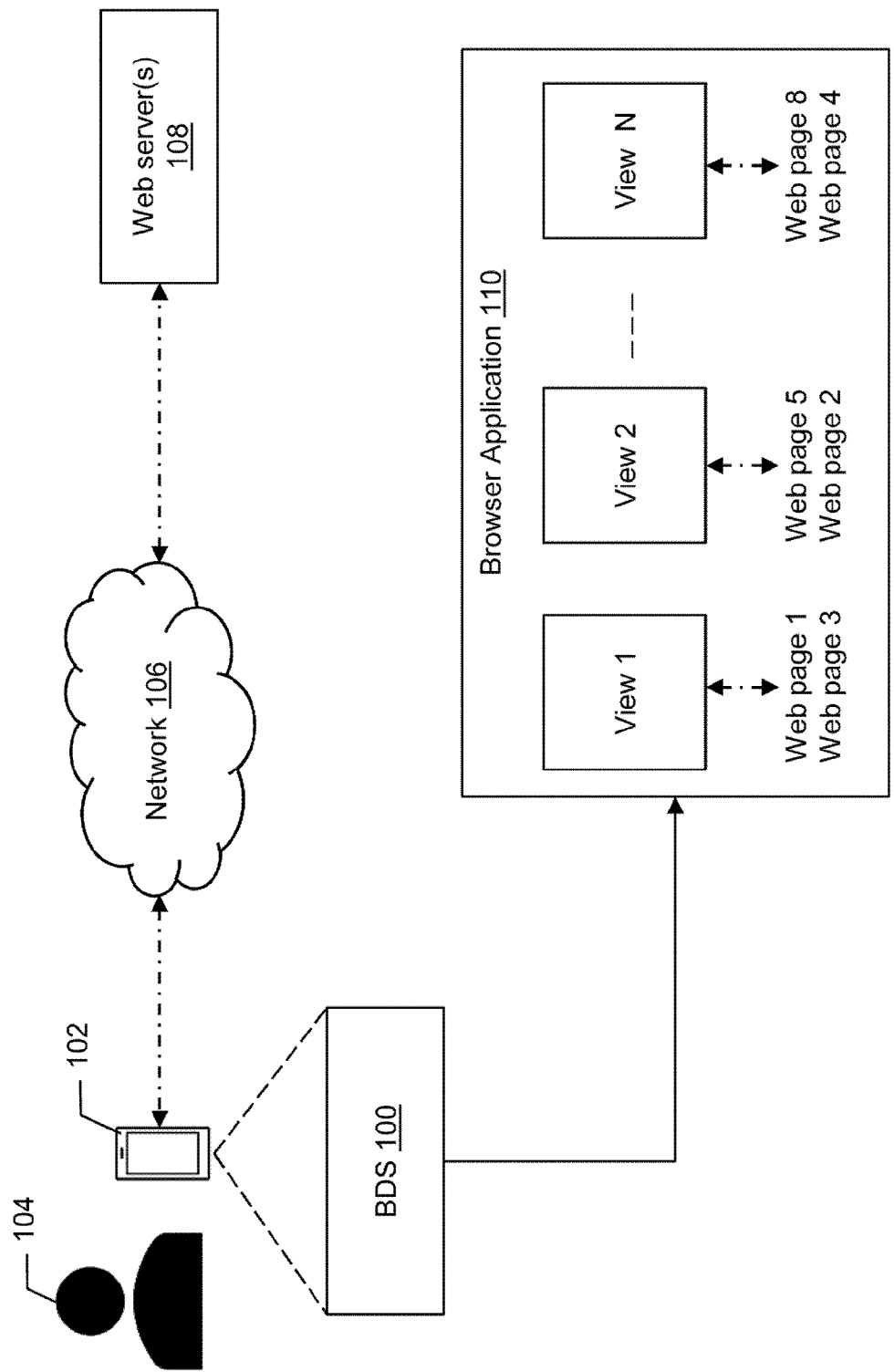
FIG. 1 illustrates a network architecture implementing a browser display system for displaying web pages on a display of an electronic device, according to an embodiment.

Below, embodiments of the disclosure will be described in detail and clearly to such an extent that one skilled in the art easily carries out the disclosure.

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which the disclosure belongs. The system, methods, and examples provided herein are illustrative only and not intended to be limiting.

Embodiments of the disclosure will be described below in detail with reference to the accompanying drawings.

FIG. 1 illustrates a network architecture of a Browser Display System (BDS) 100 for displaying web pages on a display of an electronic device (e.g., a user device), according to an embodiment. Examples of computing devices 102 in which the BDS 100 may be provided may include, but are not limited to, a smartphone, a tablet, a personal digital assistant, a desktop computer, a workstation computer, and a laptop.

In an example, a user 104 may operate the computing device 102 for opening one or more web pages 1-N in a browser application 110 running on the computing device 102. The computing device 102, in an example, may be communicatively coupled to a network 106 that may be, for example, a Local Area Network (LAN), or the Internet. Using the network 106, the computing device 102 may request for one or more web pages from one or more web servers 108.

According to an example embodiment, the BDS 100 may be configured to receive a user request for opening a web page, e.g., web page 1, in the browser application 110. This user request may be provided by the user 104 using the browser application 110. For instance, the user 104 may open the browser application 110 in the computing device 102 and may enter a Uniform Resource Locator (URL) of the web page in the browser application 110. In another example, the user may provide a voice input to the computing device 102 for opening a web page in the browser application 110. In yet another example, the URL may be shared as a link in another application, for example, in a message of a messaging application, and the user may click on the link to open the URL. The above examples are provided for illustrative purposes only and the disclosure is not limited to these examples.

On receiving the user request, the BDS 100 may be configured to select, from a plurality of views, a view in which the web page is to be opened based on metadata corresponding to the web page. The view, as described herein, may be understood as a mode of the browser window in which the browser window is launched. Examples of the view may include, but are not limited to, a standard view, an incognito/secret mode, a reader view, a dark/high contrast view, and a floating view. The metadata in an example embodiment may include, but not limited to, a URL of the web page, and lexical features of the URL, main and sub resources, browsing data, web content and related features, web page permissions, web push notifications, viewport, scale factor, device aspect ratio and other capabilities, a category of the web page, display requirements of the web page, etc.

In an example, each view of the plurality of views has a unique set of viewing properties. Without limitation, the viewing properties may be understood as browser properties or settings that affect the browsing activity in the view. These viewing properties may include, but are not limited to, a setting for recording a history of browsing sessions, a text zoom setting, an advertisement blocker setting, a contrast setting, a multimedia setting, etc. Accordingly, each of the views provides for different browsing experience. For instance, the standard view may be understood as a view where a history of the browsing activity of the user 104 is maintained. On the other hand, in an incognito view, the history of the browsing activity is not recorded. Similarly, the reader view may be understood as a view which provides for a zoomed-in view of the web page. Furthermore, the reader view may be understood as a view which provides clutter free user experience by filtering other less important things like ads, extra images, iframes etc. and may have other features for the user such as text, zoom, etc. In another example, the floating view may be used for viewing a web page which provides live sports updates. Furthermore, the high contrast view may be used when the user is browsing a wallpaper or graphic heavy websites. As would be appreciated, the aforementioned descriptions of the views are for example purposes only and are not limiting in any manner.

The automatic selection of the views by the BDS 100 for rendering web pages enhances the user experience of viewing the web pages. For instance, the user needs not to manually make selection of views. As an example, consider a case where a user has web pages opened in a standard view. In the related art, when a user wants to open a banking web page and wants to maintain secrecy, the user needs to manually change the view to the incognito view. According to the embodiment, the BDS 100 identifies that the user has requested for the banking web page and accordingly, the BDS 100 automatically opens the web page in the incognito view. This operation is of further assistances in cases where the user may not be tech-savvy and may not be aware of the benefits, for example, secrecy benefits, of opening the banking web page in the incognito mode. As the BDS 100 may automatically open the web page in the incognito mode, the user who is not tech-savvy would be provided with the benefits of opening the web page in the incognito mode.

On selecting the view, the BDS 100 may be configured to display the web page in a browser window of the browser application 110, based on the unique set of viewing properties of the selected view.

As is shown in FIG. 1, the BDS 100 may determine that the web pages 1 and 3 may be opened in respective browser windows using view 1. Accordingly, the BDS 100 may open the web pages 1 and 3 in respective browser windows using view 1. The web pages 5 and 2 may be opened in respective browser windows using view 2, and the web pages 8 and 4 may be opened in respective browser windows using view N.

In another example embodiment, the BDS 100 may be configured to monitor a web browsing history and a web browsing pattern of a user. Based on the monitoring, the BDS 100 may be configured to create a database with a correlation of the monitored history and a pattern of browsing. Furthermore, the BDS 100 may be configured to detect a user input in a device to open a web page. The BDS 100 analyses a layout of the device with reference to multiple corresponding views available in the database for the web page. Accordingly, the BDS 100 chooses an optimum view for displaying the web page to match with the layout of the device.

Selection of the view that is best suited for displaying on the layout of the device is done based at least in part on the correlated web browsing history and web browsing pattern of the user. Accordingly, an optimum user experience is provided to the user when the user is browsing the web pages. For instance, the user does not need to apply a personalized change(s) every time the user visits a web page. As the web browsing history and the web browsing pattern are monitored and correlated, the BDS 100 makes use of the same and automatically identifies and selects the best view for rendering the web page, thereby minimizing the efforts on the part of the user to customize the view in which the web page is to be opened.

Figure 2:
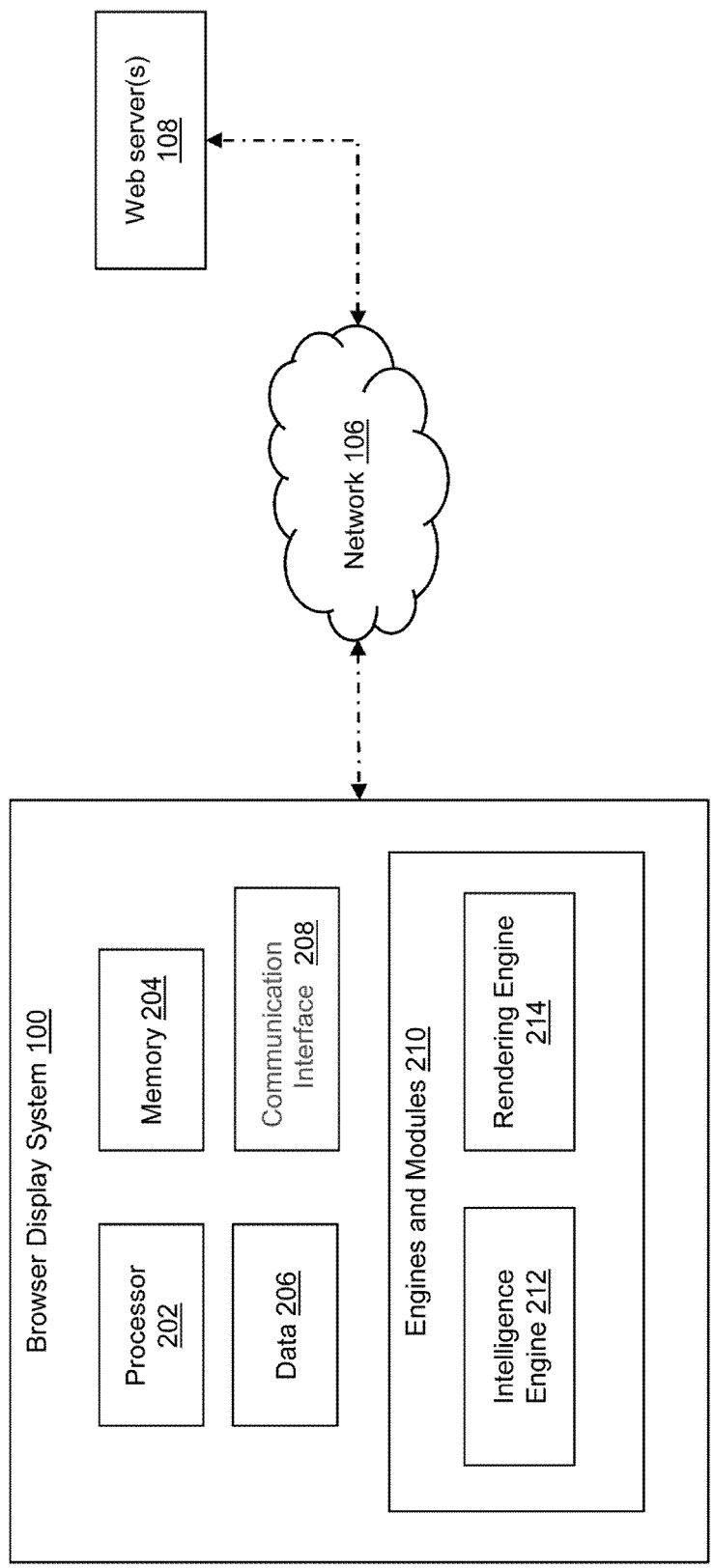
FIG. 2 illustrates a schematic block diagram of a browser display system, according to an embodiment.

FIG. 2 illustrates a schematic block diagram of the BDS 100, according to an embodiment. In an example, the BDS 100 may be implemented in computing devices, such as the computing device 102 described herein. Furthermore, the BDS 100 may be implemented in a single device or in a distributed manner in a plurality of device, the implementation of which would be apparent to a person skilled in the art. In an example embodiment, the BDS 100 may include at least one processor 202, memory 204, data 206, at least one communication interface 208, and engines and modules 210.

In an example, the processor 202 may be a single processing unit or a plurality of units, and the single processing unit or the plurality of processing units may include multiple computing units. The processor 202 may be implemented as one or more microprocessors, microcomputers, microcontrollers, digital signal processors, central processing units, state machines, logic circuitries, an application processor (AP), or the like, a graphics-only processing unit such as a graphics processing unit (GPU), a visual processing unit (VPU), and/or an AI-dedicated processor such as a neural processing unit (NPU), and/or any devices that manipulate signals based on operational instructions. Among other capabilities, the processor 202 is configured to fetch and execute computer-readable instructions and data stored in the memory 204.

The memory 204 may include any non-transitory computer-readable medium including, for example but not limiting, a volatile memory, such as a static random access memory (SRAM) and a dynamic random access memory (DRAM), and/or a non-volatile memory, such as a read-only memory (ROM), an erasable programmable ROM, flash memories, hard disks, optical disks, and magnetic tapes.

The data 206 serves, amongst others, as a repository for storing data processed, received, and generated by one or more of the processor 202. Writing further, in a non-limiting manner, one or more of the aforementioned components of the BDS 100 may send or receive data, for example, using one or more input/output ports and one or more communication interfaces.

In an example, the communication interface 208 may include one or more hardware units that support wired or wireless communication between the BDS 100 and any other computing devices.

The engines and module(s) 210, amongst others, may include routines, programs, objects, components, data structures, etc., which perform particular tasks or implement data types. The engines and module(s) 210 may also be implemented as, signal processor(s), state machine(s), logic circuitries, and/or any other device or component that manipulate signals based on operational instructions.

Further, the engines and module(s) 210 may be implemented in hardware, instructions executed by at least one processing unit, e.g., processor 202, or by a combination thereof. The processing unit may be a general-purpose processor which executes instructions to cause the general-purpose processor to perform operations or the processing unit may be dedicated to performing the functions. In another embodiment of the disclosure, the engines and module(s) 210 may be machine-readable instructions (software) which, when executed by a processor and/or a processing unit, may perform any of the described functionalities.

In some example embodiments, the engines and module (s) 210 may be machine-readable instructions (software) which, when executed by a processor and/or a processing unit, perform any of the described functionalities.

In an example, the engines and module(s) 210 may include an intelligence engine 212 and a rendering engine 214. In an example, the processor 202 may be coupled to the engines and module(s) 210 for performing one or more operations, as described herein.

Furthermore, in an example embodiment, at least one of the plurality of engines and module(s) 210 may be implemented through an artificial intelligence (AI) model. In an example embodiment, the processor 202 may provide input data to the AI model and accordingly obtain inference data from the AI model. Herein, the AI model may be a trained neural network model. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks. According to an intended aim/goal of the AI model, the AI model may be trained using learning algorithms and training data during the training phase. Examples of learning algorithms include, but are not limited to, supervised learning, unsupervised learning, semi-supervised learning, recommendation algorithms, and reinforcement learning. In an example, the AI model may be trained on-device, i.e., on the computing device 102. Herein, the AI model may continue learning during the implementation phase as well. In another example, the AI model may be hosted on a remote computing device and accordingly the trained AI model may be pushed to the computing device 102.

In an example embodiment, the intelligence engine 212 may be configured to receive a user request for opening a web page in a browser application, such as the browser application 110. In an example, the user request may be provided by the user directly through the browser application or the user may click on a URL in any other application and accordingly may trigger launching of the URL in the browser application.

In an example embodiment, the intelligence engine 212 may be configured to select a view from a plurality of views in which the web page is to be opened, based on metadata associated with the web page. For example, from the metadata, the intelligence engine 212 may learn about the type of a website being accessed. The type of the website may include, sports, news, banking, entertainment, etc. Accordingly, the intelligence engine 212 may be configured to select a view from the plurality of views for opening the web page. In an example, a mapping between the types of web pages and corresponding views may be stored in the data 206. This mapping, in an example, may be predetermined by a developer, or in another example, may be learned and developed based on the browsing history and browsing patterns of the user, for example, by the intelligence engine 212. Thus, as and when a user requests for a web page, the learning engine 212 may access the mapping stored in the data 206 and may accordingly select the view in which the web page is to be opened. In an example, each of the views of the plurality of views may have a unique set of viewing properties.

In an example embodiment, the intelligence engine 212 may be configured to create a personalization database and store the personalization database in the data 206. In the personalization database, the intelligence engine 212 may be configured to record user's preferences with respect to various web pages, based on the user's web browsing history and web browsing pattern. The web browsing pattern may be understood as one or more personalization(s) that the user may perform with respect to a given web page. Without limitation, the personalization may include at least one of brightness settings, zoom settings, view settings, e.g., whether standard, reader, incognito, customized, or any other view is used for opening the web page, volume preferences, video quality streaming preferences, etc. The personalization may also be referred to as a view preference setting. Furthermore, the web browsing pattern may include the time of the day of the web browsing.

In an example, the intelligence engine 212 may be configured to correlate the web browsing history and the web browsing pattern, and store the same in the personalization database as user personalization data. Based on the correlation, the intelligence engine 212 may identify and store at least a user preference of a view for the web page and at least a view preference setting for the identified view. The intelligence engine 212 may store the user preference and the view preference setting in the user personalization data. Thus, the personalization database includes the user personalization data corresponding to a plurality of web pages. The user personalization data, in an example, may be mapped with or form a part of the mapping stored in the data 206.

In an example, the intelligence engine 212 may implement an AI model for generating the mapping and the user personalization data. The AI model used herein may be of the one or more of the example types as mentioned above herein. In an example, the aforementioned AI model may be trained using one or more of supervised, unsupervised, semi-supervised, reinforcement learning algorithms using training data. Herein, training data may include labelled, non-labelled, and/or partially labelled data including details such as web pages history and user preferences for the same.

Thus, in an example embodiment, for selecting the view, the intelligence engine 212 may be further configured to access the personalization database. Subsequently, the intelligence engine 212 may determine whether user personalization data corresponding to the requested web page is available. In a case where the user personalization data for the requested web page is available, the intelligence engine 212 may be configured to select the view based on the user personalization data. In other words, the intelligence engine 212 may learn the user's preferred view from the user personalization data and accordingly select that view.

In an example embodiment, on selecting the view, the rendering engine 214 may be configured to display the web page in a browser window of the browser application based on the unique set of viewing properties corresponding to the selected view.

In an example embodiment, when the user personalization data for the requested web page is determined to be available, the intelligence engine 212 may be further configured to determine at least one view preference setting from the user personalization data. The at least one view preference setting may be a setting of zoom, brightness, volume, streaming quality, storing cookies and site data, information filed in forms, etc., that is associated with the view for the given web page. When the view preference setting is determined to be available, the rendering engine 214 may be configured to modify one or more viewing properties associated with the browser window based on the view preference setting. For example, the intelligence engine 212 may determine a preference of brightness for the web page. Accordingly, the rendering engine 214 may be configured to modify the brightness level for the web page.

According to an embodiment of the disclosure, the BDS 100 also provides for grouping of multiple browser windows that have the same view. For instance, in an example embodiment, the intelligence engine 212 may be configured to determine whether another browser window with the same view is open in the display of the electronic device (or user device). In a case where it is determined that another browser window with the same view is open in the display of the user device, the rendering engine 214 may be configured to group the browser window with the another browser window in the same view. In other words, for example, if a browser window in a reader view is to be opened and it is determined that another browser window with a reader view is already opened in the display, the two browser windows may be grouped together. In an example, the two windows may be pinned as different tabs in the browser windows.

In some embodiments, the BDS 100 may be configured to select different views when requests are sent to the same domain. For instance, a user opens an email website, e.g., example.com, and may login using a first email address. Now, the user may again seek to open example.com. In the related art, the user being already logged in, the web page opens up with the first email address only. However, according to the BDS 100 in embodiments of the disclosure, the second request to the domain example.com is opened in a different view. This enables the user to login through a different email account.

Accordingly, in some example embodiments, the intelligence engine 212 may be configured to identify that the requested web page pertains to a first domain. Subsequently, the intelligence engine 212 may be configured to determine whether another web page pertaining to the first domain is open in another browser window with the same view in the display of the user device. In a case where it is determined that the another web page pertaining to the first domain is open in another browser window with the same view in the display of the user device, the intelligence engine 212 may be configured to determine whether a user has logged into the first domain using the another web page using a first user account.

In a case where it is determined that the user has logged into the first domain using the another web page using the first user account, the intelligence engine 212 may be configured to select the view for the web page, such that the selected view is different from the view selected for the another web page. In other words, if the another web page is opened in the standard view, the intelligence engine 212 may select, for example, an incognito view for the requested web page. Thus, the user may be provided with an option to use a second account with the web page. After the selection, the rendering engine 214 may be configured to open the web page in the browser window in the selected view, such that the first domain does not recognize the request for accessing the web page from the first user account. Thus, the web page opens without using the first account and the user may access the web page using a second account.

According to an embodiment of the disclosure, the BDS 100 may be configured to intelligently display the browser windows on the display of the user device, when multiple browsing windows are opened on the display. To that end, the rendering engine 214 may be configured to determine whether at least one other browser window is open in the display of the user device. In a case where the rendering engine 214 determines that the at least one other browser window is open in the display of the user device, the rendering engine 214 may be configured to determine a size of the display of the user device and an orientation of the user device.

Continuing with the above example, the rendering engine 214 may be configured to determine whether the browser window and the at least one other browser window may be concurrently displayed on the display of the user device, based on the size of the display and the orientation of the user device. The rendering engine 214 may make such determination based on the viewing properties of the views in which the two browser windows are opened. Accordingly, the rendering engine 214 may determine, based on the size of the display and the orientation, whether the two browser windows may be display concurrently. This determination, in an example embodiment, may include a determination as to whether the content size is adequately maintained. In a case where it is determined that the browser window and the at least one other browser window may be concurrently displayed on the display of the user device, the rendering engine 214 may be configured to display the browser window and the at least one other browser window concurrently on the display according to a predetermined layout. This predetermined layout, in an example embodiment, may be a horizontal side-by-side layout of the two browser windows. In another example embodiment, the layout may be vertical side-by-side layout of the two browser windows. As would be appreciated in cases of more than two browser windows, other layouts that are best suited for multiple browser windows may be used as the predetermined layout.

In another example where it is determined that the browser window and the at least one other browser window cannot be concurrently displayed on the display of the user device, the rendering engine 214 may display the browser window and the at least one other browser window in an overlapped manner, with the latest browser window being displayed on top.

In some example embodiments, the BDS 100 may be configured to identify whether a conflict exists between the display properties of the view and the browser window. Based on identifying the conflict, the BDS 100 may be configured to resolve the conflict and display the content accordingly. For instance, in an example embodiment, the intelligence engine 212 may be configured to determine whether at least one view property associated with the selected view contradicts with at least one property of the browser window, for displaying content of the web page in the browser window. An example of a conflict may be when a reader view requires a zoom at a level of 150%, whereas the browser window has a default setting of displaying the content at a default view level (e.g., 100% of a zoom level). Accordingly, in an example embodiment, the intelligence engine 212 may be configured to select the at least one view property associated with the selected view, when it is determined that at least one view property associated with the selected view contradicts with at least one property of the browser window. Furthermore, the rendering engine 214 may be configured to display the content of the web page in the browser window based on the at least one view property associated with the selected view.

Figure 3:
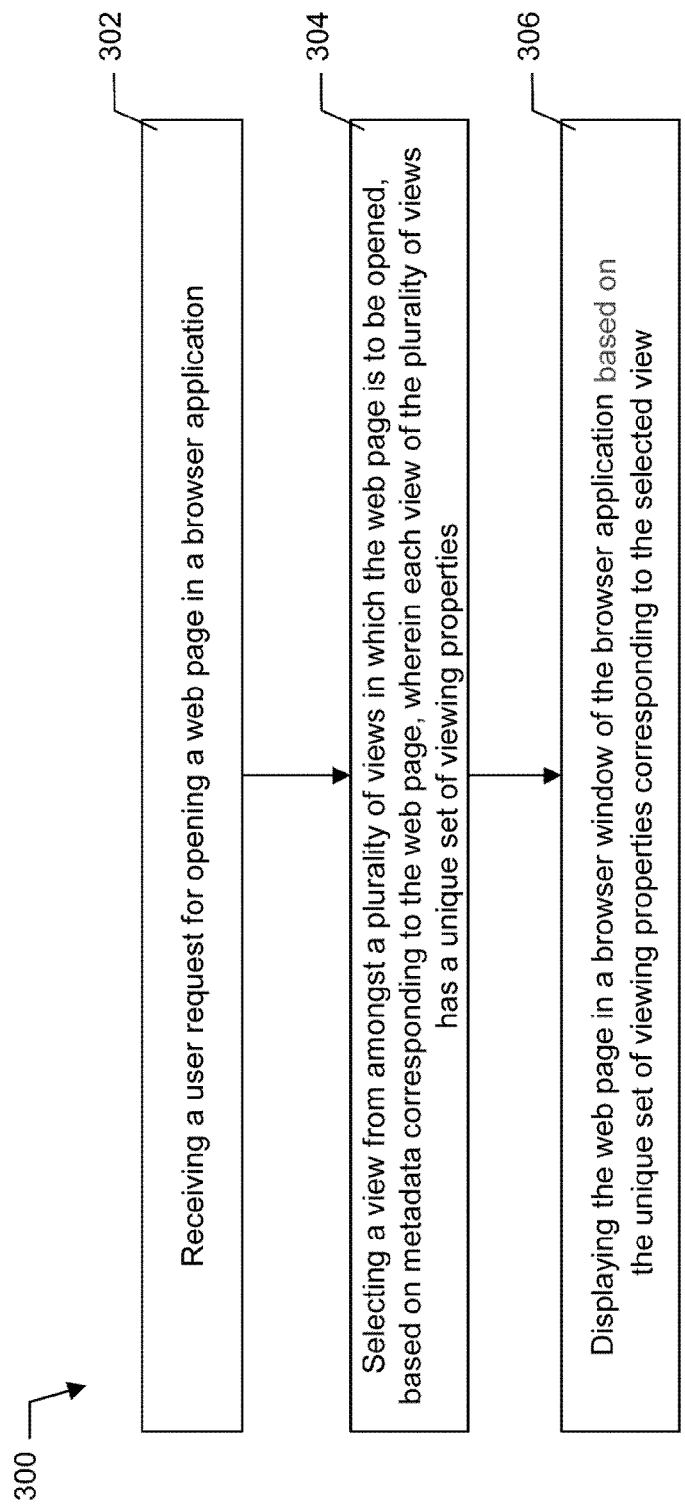
FIG. 3 illustrates a flowchart of a method of displaying web pages on a display of an electronic device, according to an embodiment.

Referring to FIG. 3, a flowchart of a method 300 of displaying web pages on a display of a user device, according to an embodiment is illustrated. In an example embodiment, operations described herein may be implemented by the BDS using one or more computing devices, such as the computing device 102. For the sake of brevity, details of operations that have already been described above are not provided herein.

As shown, at operation 302, the method 300 includes receiving a user request for opening a web page in a browser application. Furthermore, at operation 304, the method 300 includes selecting, from a plurality of views, a view in which the web page is to be opened, based on metadata corresponding to the web page, wherein each view of the plurality of views has a unique set of viewing properties. Furthermore, at operation 306, the method 300 includes displaying the web page in a browser window of the browser application based on a set of viewing properties corresponding to the selected view.

In some embodiments, the method 300 includes, accessing a personalization database comprising user personalization data corresponding to a plurality of web pages. Furthermore, the method 300 includes determining availability of the user personalization data corresponding to the web page in the personalization database, the user personalization data including at least a user preference of a view for the web page. Furthermore, the method 300 includes selecting the view further based on the user personalization data, when the user personalization data corresponding to the web page is determined to be available.

In some embodiments, the method 300 includes, accessing a personalization database comprising user personalization data corresponding to a plurality of web pages. Furthermore, the method 300 includes determining availability of the user personalization data corresponding to the web page in the personalization database, the user personalization data including at least a view preference setting. Furthermore, the method 300 includes modifying one or more viewing properties associated with the browser window based on the view preference setting, when the user personalization data corresponding to the web page is determined to be available.

In some embodiments, the method 300 includes, determining whether another browser window with the same view is open in the display of the user device. Furthermore, the method 300 includes grouping the browser window with the another browser window in the same view, when it is determined that another browser window with the same view is open in the display of the user device.

In some embodiments, the method 300 includes, identifying that the web page pertains to a first domain. Furthermore, the method 300 includes determining whether another web page pertaining to the first domain is open in another browser window with the same view in the display of the user device. Furthermore, the method 300 includes determining whether a user has logged into the first domain using the another web page using a first user account, when it is determined that the another web page pertaining to the first domain is open in another browser window with the same view in the display of the user device. Furthermore, the method 300 includes selecting the view for the web page, such that the selected view is different from the view selected for the another web page, when it is determined that the user has logged into the first domain using the another web page using the first user account. Furthermore, the method 300 includes opening the web page in the browser window in the selected view, such that the first domain does not recognize the request for accessing the web page from the first user account.

In some embodiments, the method 300 includes, determining whether at least one other browser window is open in the display of the user device. Furthermore, the method 300 includes determining a size of the display of the user device and an orientation of the user device, when it is determined that the at least one other browser window is open in the display of the user device. Furthermore, the method 300 includes determining whether the browser window and the at least one other browser window may be concurrently displayed on the display of the user device, based on the size of the display and the orientation of the user device. Furthermore, the method 300 includes displaying the browser window and the at least one other browser window concurrently on the display based on a predetermined layout, when it is determined that the browser window and the at least one other browser window may be concurrently displayed on the display of the user device.

In some embodiments, the method 300 includes, determining whether at least one view property associated with the selected view contradicts with at least one property of the browser window, for displaying content of the web page in the browser window. Furthermore, the method 300 includes selecting the at least one view property associated with the selected view, when it is determined that at least one view property associated with the selected view contradicts with at least one property of the browser window. Furthermore, the method 300 includes displaying the content of the web page in the browser window based on the at least one view property associated with the selected view.

Figure 4:
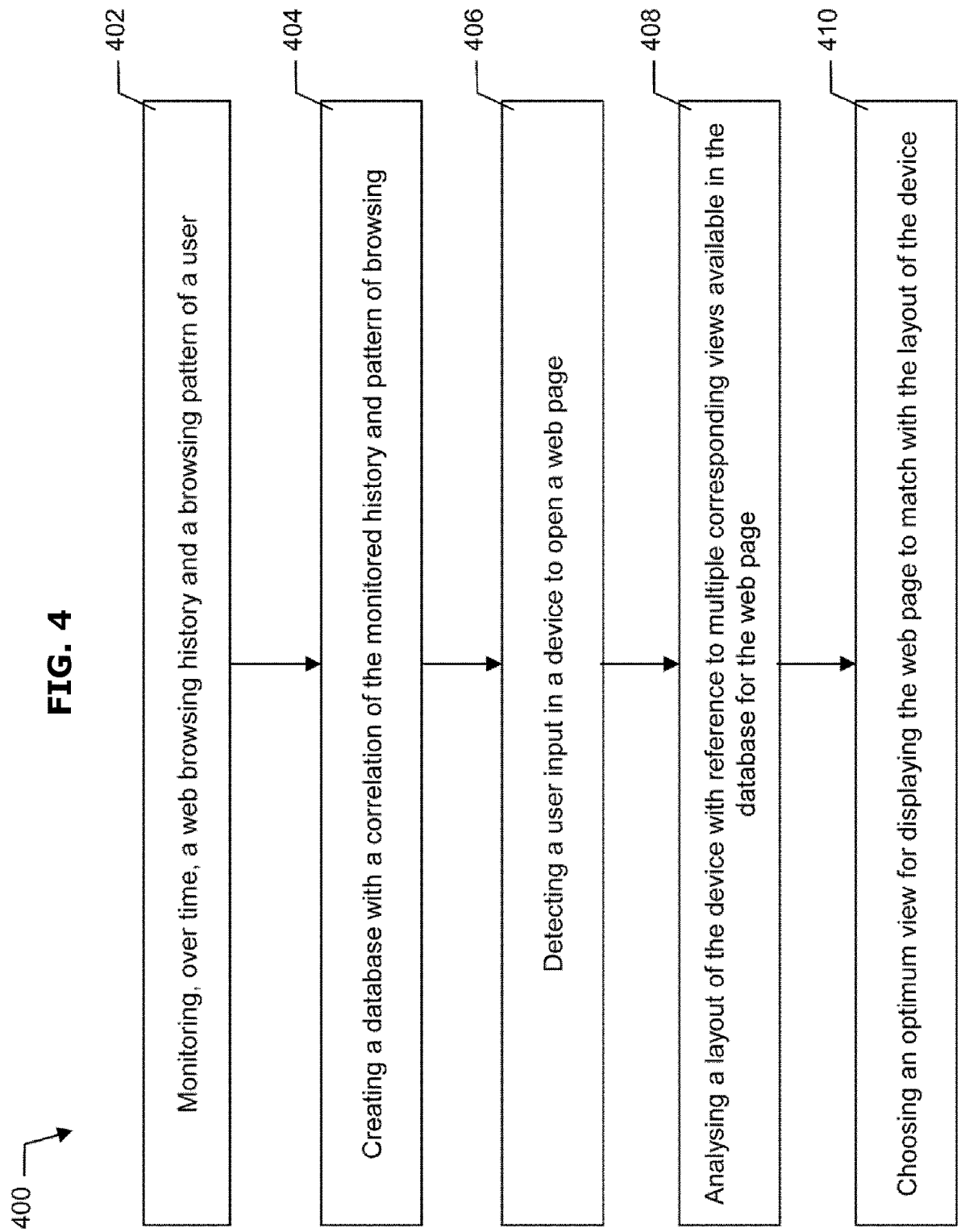
FIG. 4 illustrates a flowchart of a method for managing multiple views in a browser of an electronic device, according to an embodiment.

Referring to FIG. 4, a flowchart of a method 400 of method for managing multiple views in a browser of an electronic device, according to an embodiment is illustrated. In an example embodiment, the operations described herein may be implemented by the BDS using one or more computing devices, such as the computing device 102. For the sake of brevity, details of operations that have already been described above are not provided herein At operation 402, the method 400 includes monitoring, over time, a web browsing history and a browsing pattern of a user. At operation 404, the method 400 includes creating a database with a correlation of the monitored history and pattern of browsing. At operation 406, the method 400 includes detecting a user input in a device to open a web page. At operation 408, the method 400 includes analysing a layout of the device with reference to multiple corresponding views available in the database for the web page. Furthermore, at operation 410, the method 400 includes choosing an optimum view for displaying the web page to match with the layout of the device.

In some example embodiments, the electronic device may include at least one of: a television (TV) set, a fridge, a foldable phone, a smartphone, a bar-shaped phone. In an example, a web browsing history includes web pages browsed by the user, a frequency of such browsing over time, etc. Furthermore, a web browsing pattern includes a settings associated with each web page browsed by the user, time of the day at which a web page is browsed, a text zoom size for the web page, etc.

Figure 5:
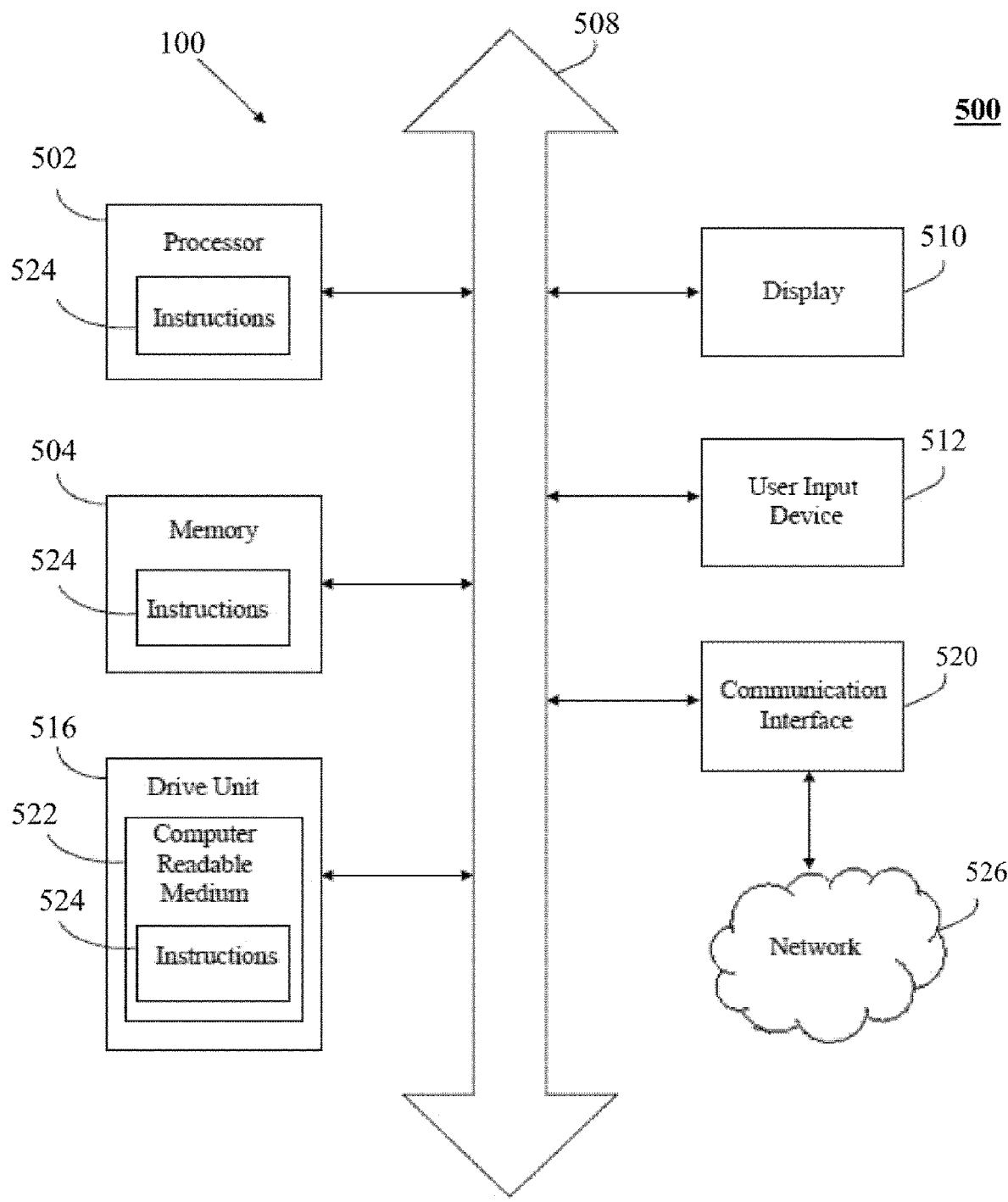
FIG. 5 shows an example implementation of a browser display system in a computer system, in accordance with an embodiment of the disclosure.

FIG. 5 shows an example implementation of the BDS 100 in a computer system 500, in accordance with the embodiment of the disclosure. The computer system 500 may include a set of instructions that may be executed to cause the computer system 500 to perform any one or more of the methods disclosed. The computer system 500 may operate as a standalone device or may be connected, e.g., using a network, to other computer systems or peripheral devices.

In a networked deployment, the computer system 500 may be implemented as or incorporated across various devices, such as a tablet PC, a personal digital assistant (PDA), a mobile-device, a palmtop computer, a laptop computer, a desktop computer, a server, a cloud server, a remote server, a communications device, or any other machine controllable through a wireless-network and capable of executing a set of instructions (sequential or otherwise) that specify actions to be taken by the machine. Further, while a single computer system 500 is illustrated, the term "system" should be understood as including any collection of systems or sub-systems that individually or jointly execute a set, or multiple-sets, of instructions to perform one or more computer functions.

The computer system 500 may include a processor 502 e.g., a central processing unit (CPU), a graphics processing unit (GPU), or both. The processor 502 may be a component in a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analysing and processing data. The processor 502 may implement a software program, such as code generated manually (i.e., programmed).

The computer system 500 may include a memory 504 that may communicate via a bus 508. The memory 504 may include, but is not limited to, computer readable storage media such as various types of volatile and non-volatile storage media, including but not limited to a random access memory, a read-only memory, a programmable read-only memory, an electrically programmable read-only memory, an electrically erasable read-only memory, a flash memory, optical media and the like. In one example, the memory 504 includes a cache or random access memory for the processor 502. In alternative examples, the memory 504 is separate from the processor 502, such as a cache memory of a processor, the system memory, or other memory. The memory 504 may be an external storage device or database for storing data. The memory 504 is operable to store instructions executable by the processor 502. The functions, acts or tasks illustrated in the figures or described may be performed by the programmed processor 502 executing the instructions stored in the memory 504. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 500 may or may not further include a touch-sensitive display unit 510, for outputting determined information as well as receiving a user's touch-gesture based inputs, such as drag and drop, single tap, multiple-taps, etc. The display 510 may act as an interface for the user to see the functioning of the processor 502, or specifically as an interface with the software stored in the memory 504 or in the drive unit 516.

Additionally, the computer system 500 may include an input device 512 configured to allow a user to interact with any of the components of system 500. An embodiment of the disclosure may be implemented in a computer-readable medium 522 that includes instructions 524 or receives and executes the instructions 524 responsive to a propagated signal so that a device connected to a network 526 may communicate voice, video, audio, images or any other data over the network 526. Further, the instructions 524 may be transmitted or received over the network 526 via a communication port or interface 520 or using the bus 508. The communication port or interface 520 may be a part of the processor 502 or may be a separate component. The communication port 520 may be created in software or may be a physical connection in hardware. The communication port 520 may be configured to connect with a network 526, external media, the display 510, or any other components in the computer system 500, or combinations thereof. The connection with the network 526 may be established wirelessly as discussed later. Likewise, the additional connections with other components of the computer system 500 may be established wirelessly. The network 526 may alternatively be directly connected to the bus 508.

The network 526 may include wireless networks that may be a cellular telephone network, an 802.11, 802.16, 802.20, 802.1Q or WiMax network. Further, the network 526 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet switched network transmission (e.g., TCP/IP, UDP/IP, HTML, HTTP) may be used.

Figure 6:
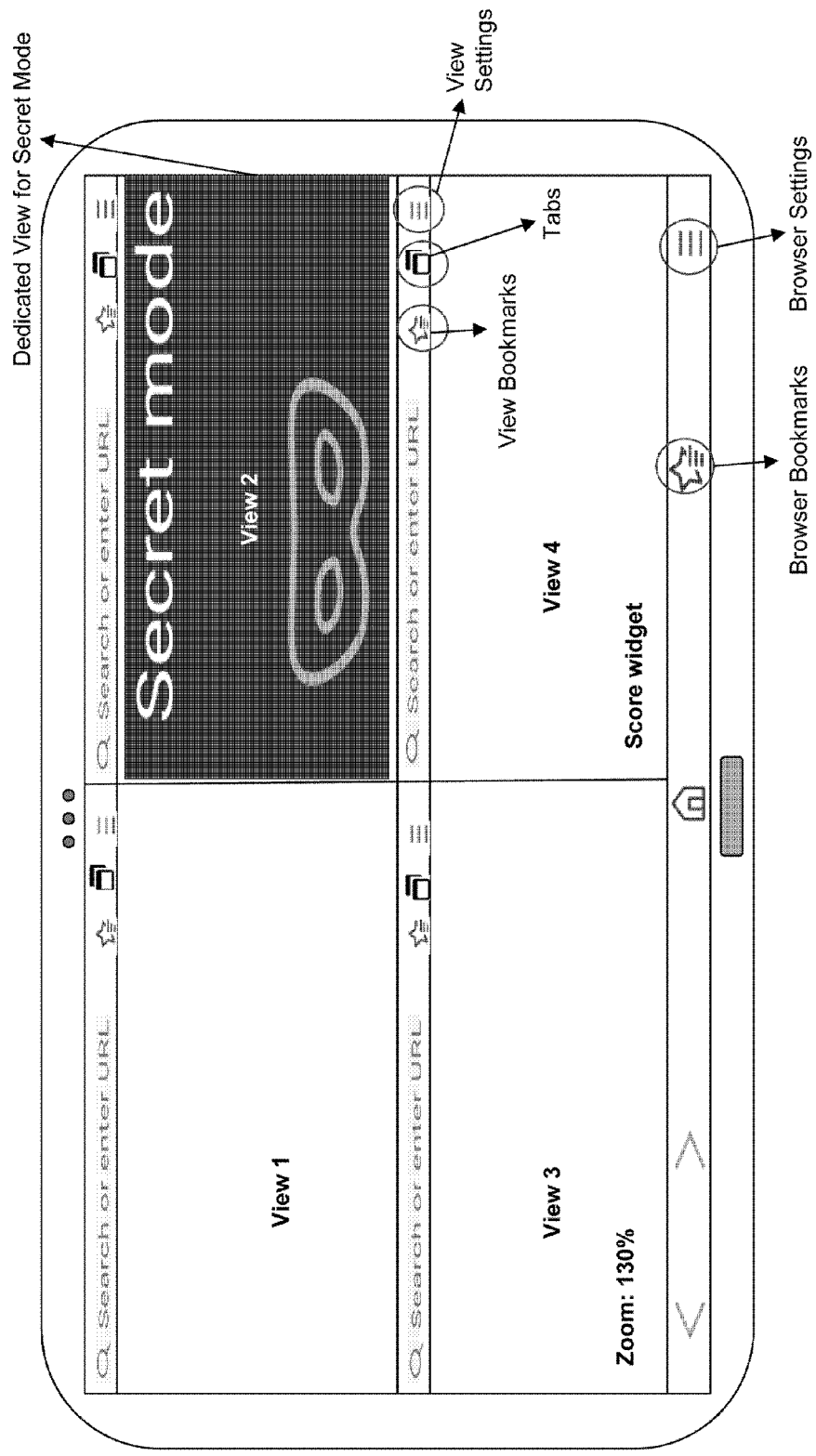
FIG. 6 illustrates different views according to an embodiment.

FIG. 6 illustrates different views according to an embodiment. As is shown in FIG. 6, view 1 may be a standard view. Furthermore, view 2 may be an incognito or secret mode, wherein the browsing history is not recorded. View 3 may be a reader view where the zoom is set to 130%. Likewise, view 4 may be a floating view where score widgets are shown. In an example, each of the views may have separate tabs, bookmarks, view settings, and browser settings.

Figure 7A:
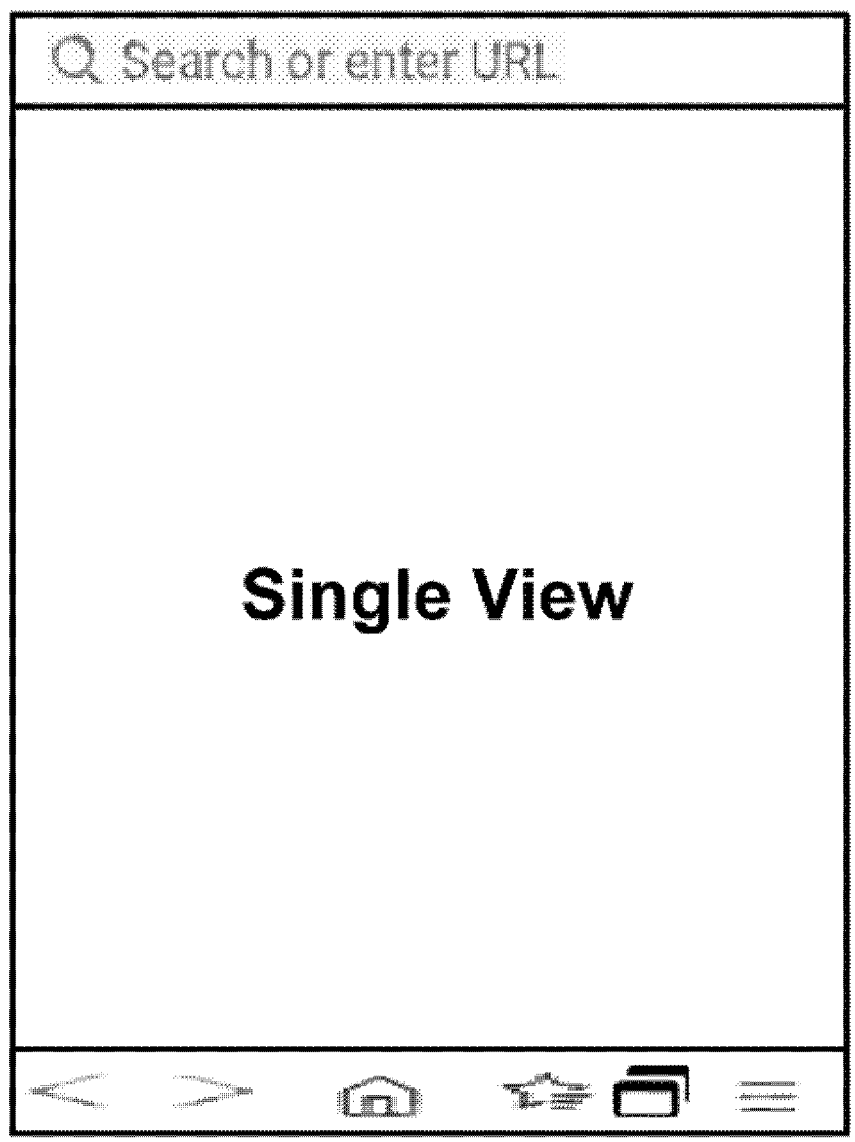
FIGS. 7A, 7B, 7C, 7D, and 7E illustrate a plurality of predetermined layouts of browser windows, according to embodiments.
Figure 7B:
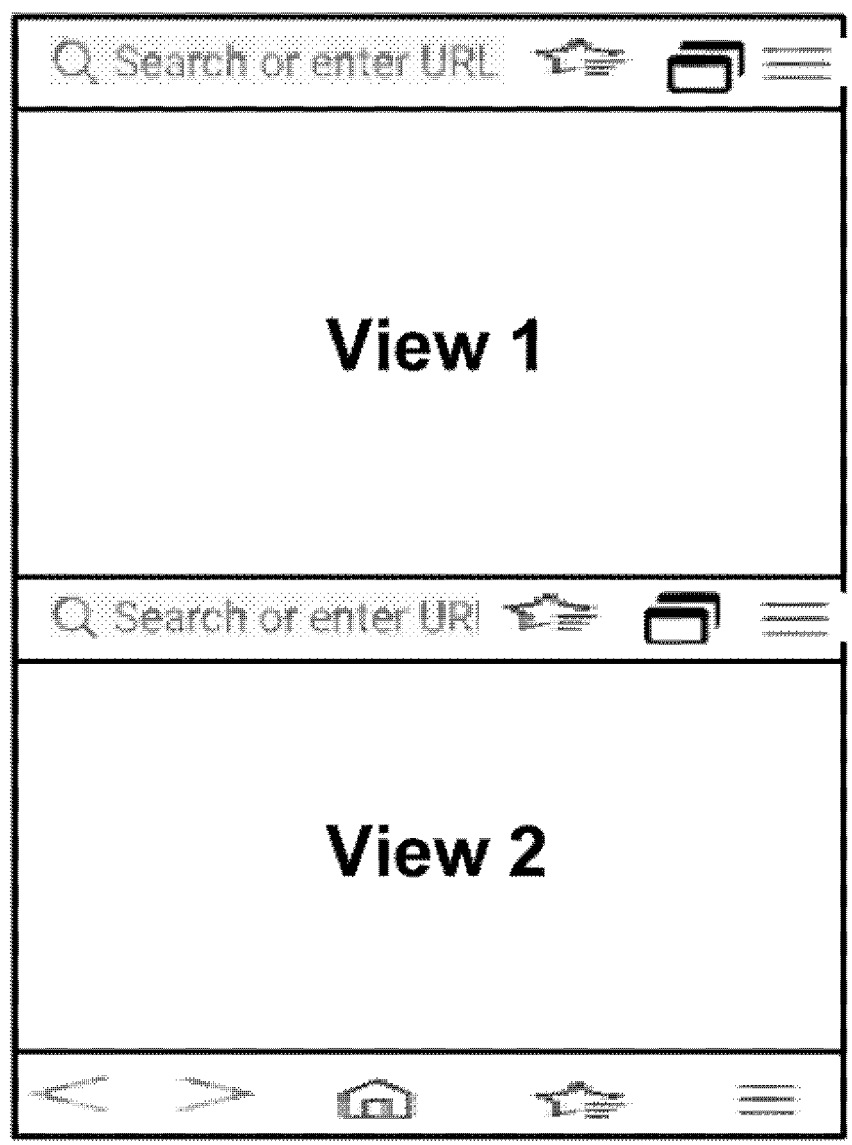
Figure 7C:
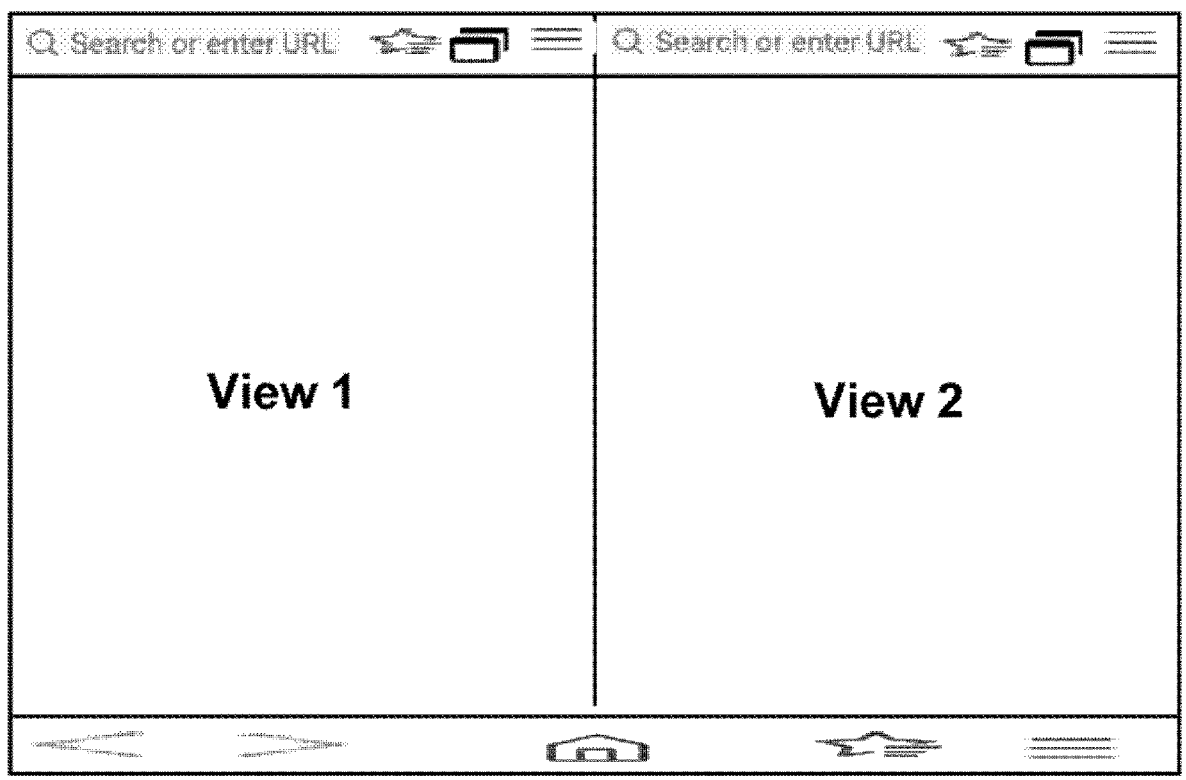
Figure 7D:
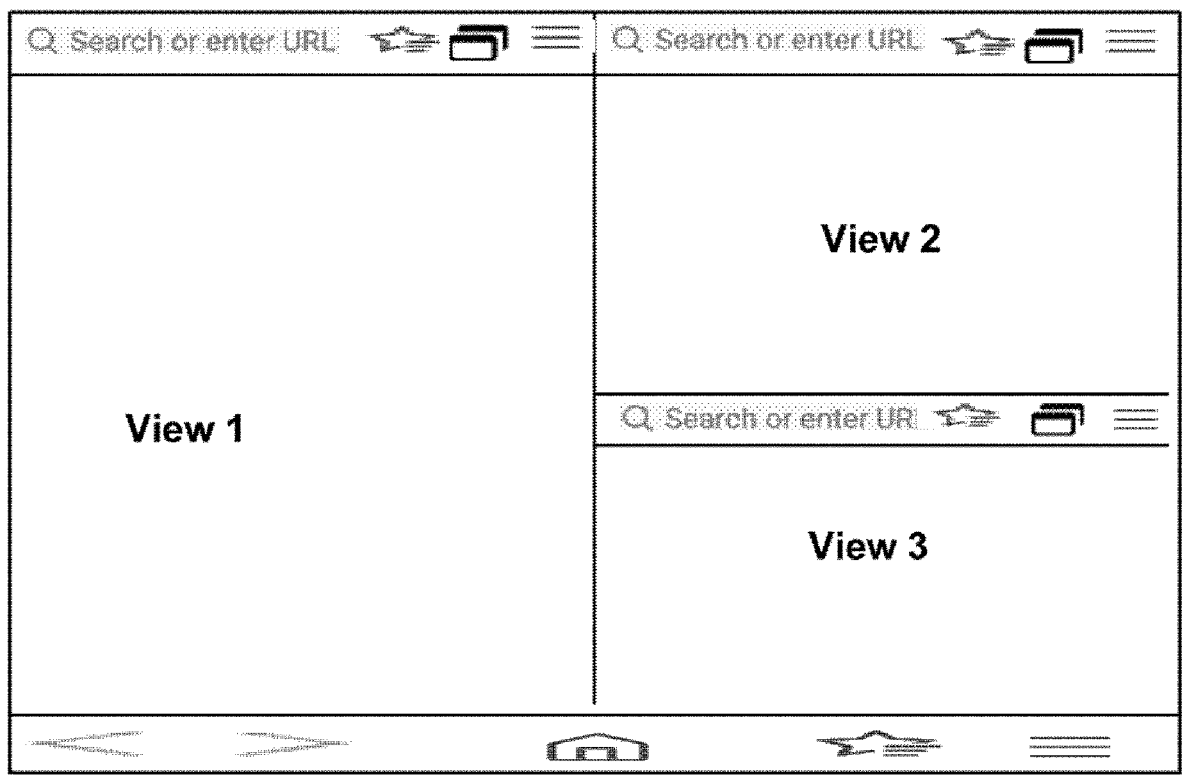
Figure 7E:
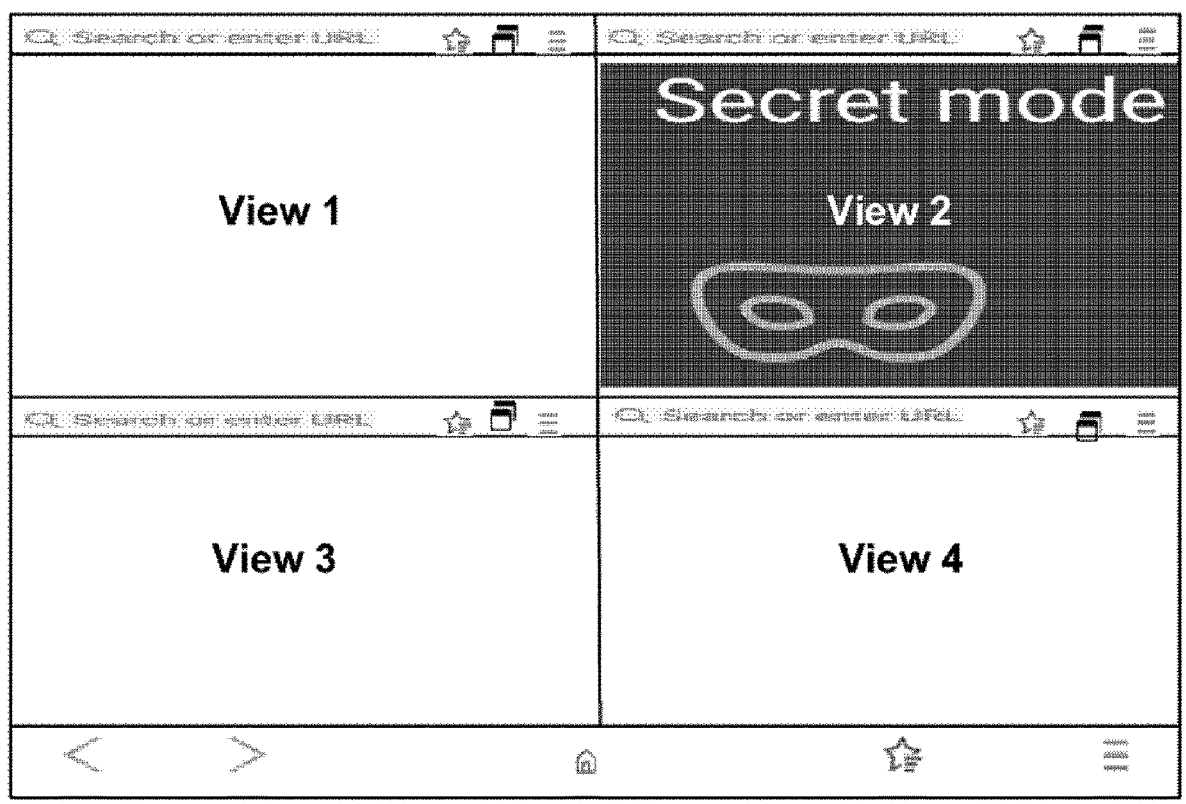

FIGS. 7A-7E illustrate a plurality of predetermined layouts of browser windows, according to embodiments. As is shown in FIG. 7A, layout 1 includes a single view. Furthermore, layout 2 includes two views in a vertical side-by-side layout as shown in FIG. 7B, and layout 3 includes two views placed in a horizontal side-by-side layout as shown in FIG. 7C. Furthermore, layout 4 shows three views as shown in FIG. 7D, and layout 5 shows four views being displayed concurrently as shown in FIG. 7E.

Figure 8A:
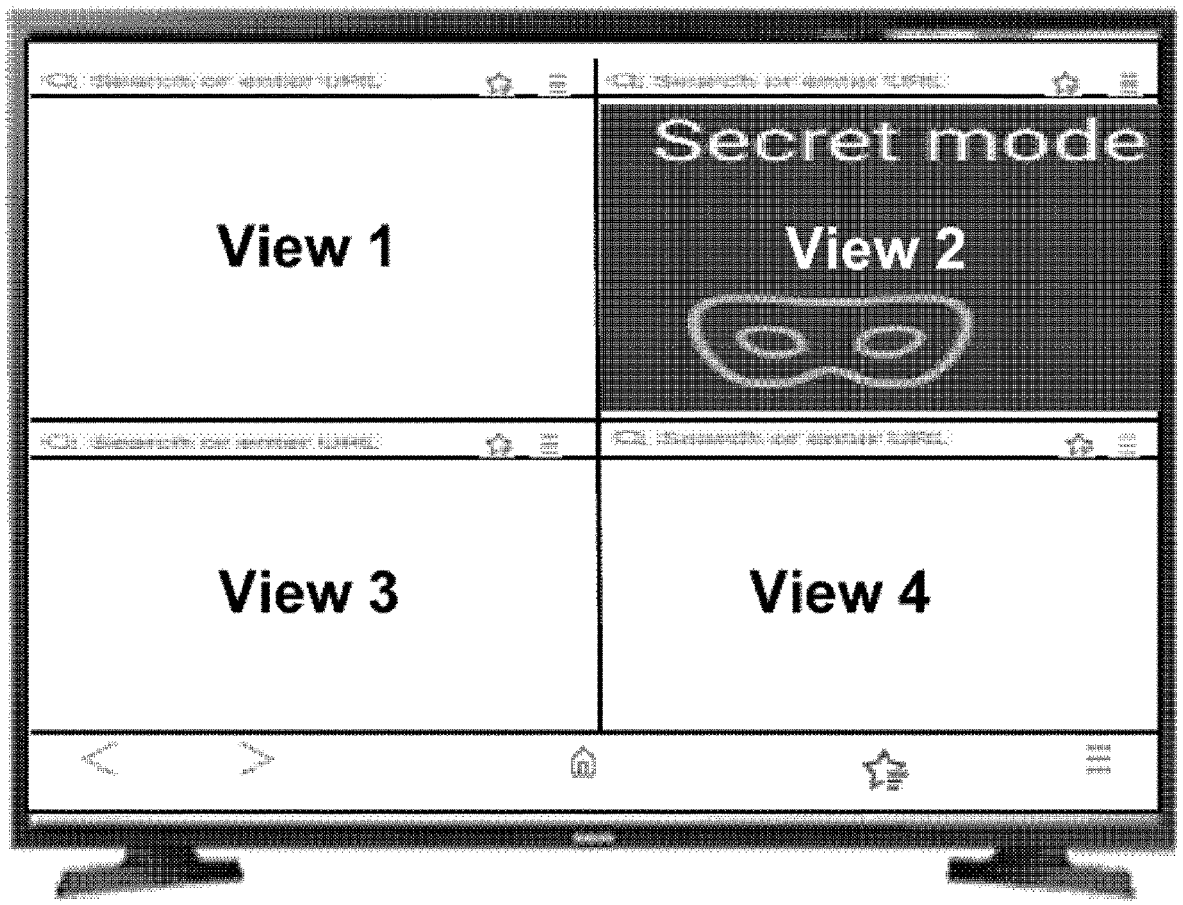
FIGS. 8A, 8B, 8C, and 8D illustrate a plurality of electronic devices having display and displaying multiple views, according to embodiments of the disclosure.
Figure 8B:
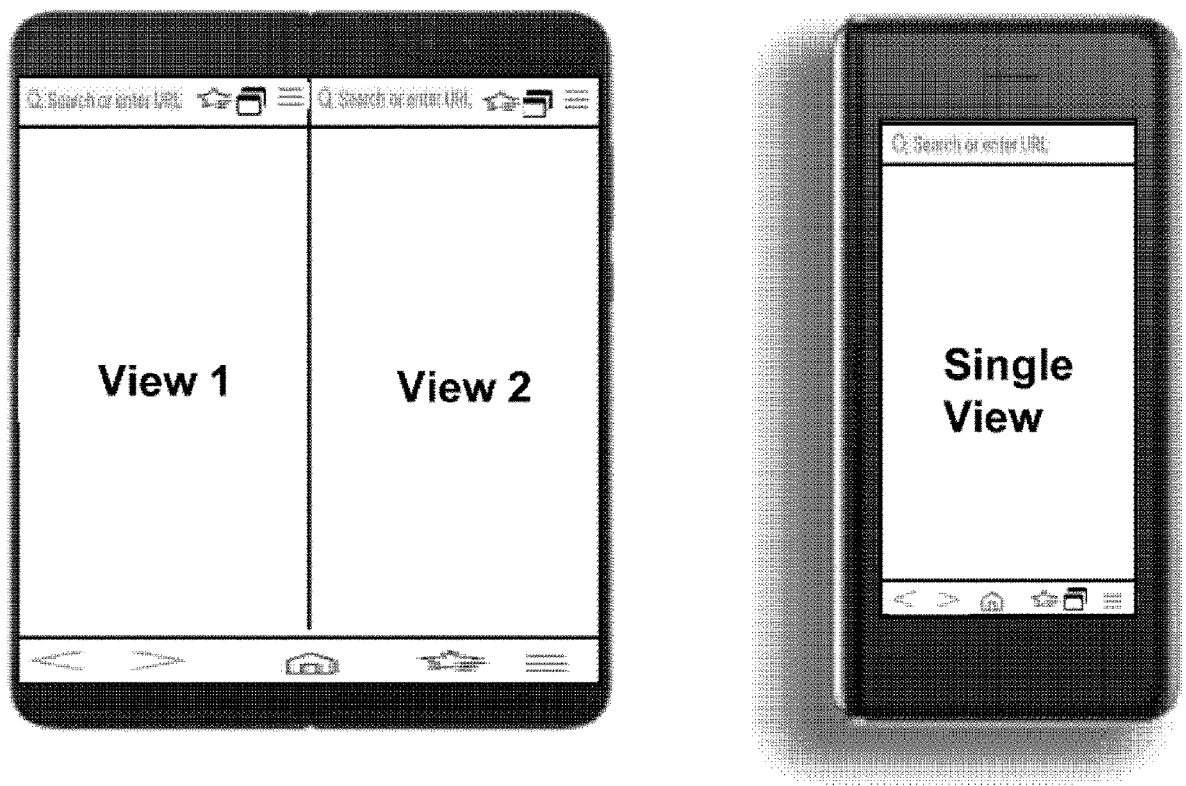
Figure 8C:
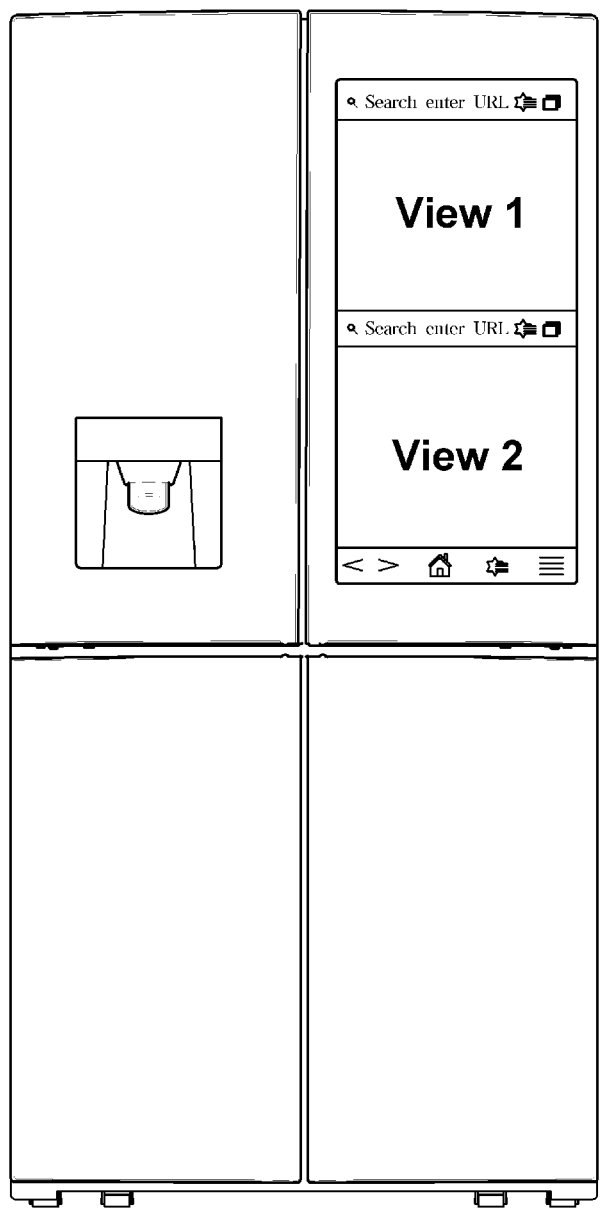
Figure 8D:
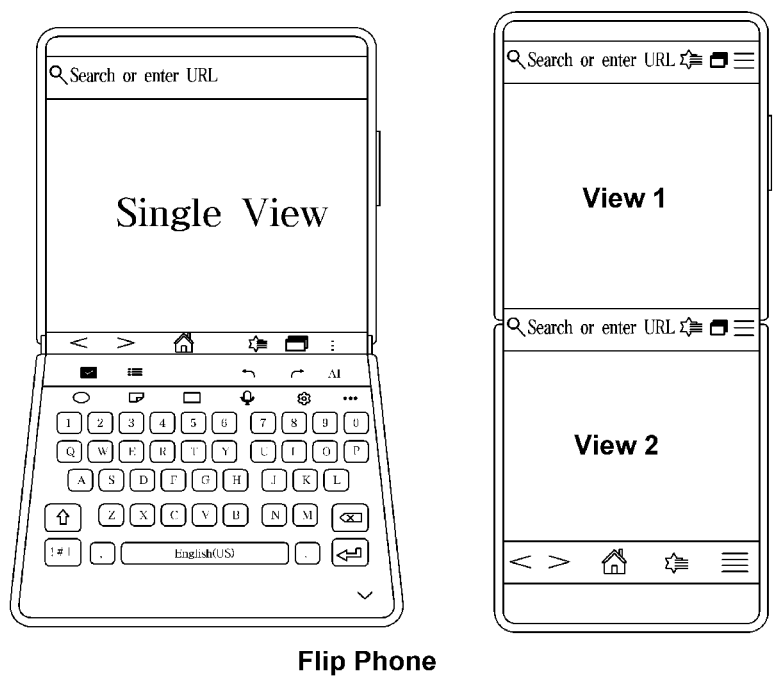

FIGS. 8A, 8B, 8C, and 8D illustrate a plurality of user devices having display and displaying multiple views of browser windows, according to embodiments of the disclosure. As shown in FIG. 8A, a smart TV may display up to or more than four views. Furthermore, a foldable phone is shown that may display either a single view or two views, as shown in FIG. 8B. Furthermore, a fridge with a display is shown. The fridge may show two views. Furthermore, a flip phone is shown, the flip phone may show either a single view or two views. As would be appreciated, the number of views shown are for illustrative purpose only and are not limiting.

FIG. 9 illustrates diagram of a system 900, according to an embodiment. In an example, the intelligence module 212 may include a learning module 902, an inference module 904, and a learned model 906. Furthermore, the rendering engine 214 may include a multi-view compositor module 908 and a multi-view layout module 910. Furthermore, the system 900 includes a browsing engine 912 and a platform framework 914. In an example, the system 900 may be implemented in a computing device, such as the computing device 102.

In an example, a user opens a website in Internet browser of a smartphone 916, either via clicking on a link from external app (SNS, Messaging, scan of QR code, etc.), or type in URL bar based on device's input capability, or by providing a voice command. The website URL, user preferences and context is given to the intelligence module engine 212.

The Intelligence engine 212 may learn from the user past preferences, website's meta details and browsing history, etc., in the learning module 902, which may apply a machine learning (ML) algorithm to a pre-trained on-device learned model 906 and pass to the inference module 904.

The inference module 904 may determine the website's settings, and preferred view and layout, and pass this knowledge to the rendering engine 214. The rendering engine 214 may receive the heuristic from ML algorithms, applied to the on-device learned model 906, based on the website meta information, preferences, and past user settings for such cluster of websites. As would be appreciated, in other implementations, the learned model 906 may be implemented on a cloud hosted service or through other implementations, such as federated experience.

Continuing with the above example, the multi-view compositor module 908 may apply the best suited view and the multi-view layout module 910 may select the layout for the website, based on inference received from Intelligence engine 212. For example, news article with a reader view, banking sites to off-the-record view, or applying high contrast, etc., may be selected by the multi-view compositor module 908. Herein, the multi-view compositor module 908 may be configured to maintain a z-order and orientation and at the same time keep the layout and rendering of views lightweight.

In some embodiments, the user may change the view settings for some websites. These inputs may be sent as feedback loop to the intelligence engine 212 so that the intelligence engine 212 makes correction next time if there is inference required on such websites. The rendering engine 214 may then pass all these information and context to the browsing engine 912 so that necessary resources, preferences, and settings may be allocated and applied for the website viewport.

Finally, the browsing engine 912 may communicate to the platform framework 914, for example, Android framework on smart phones, Tizen Framework on watches and refrigerators, to provide the content to the user's device.

Figure 10:
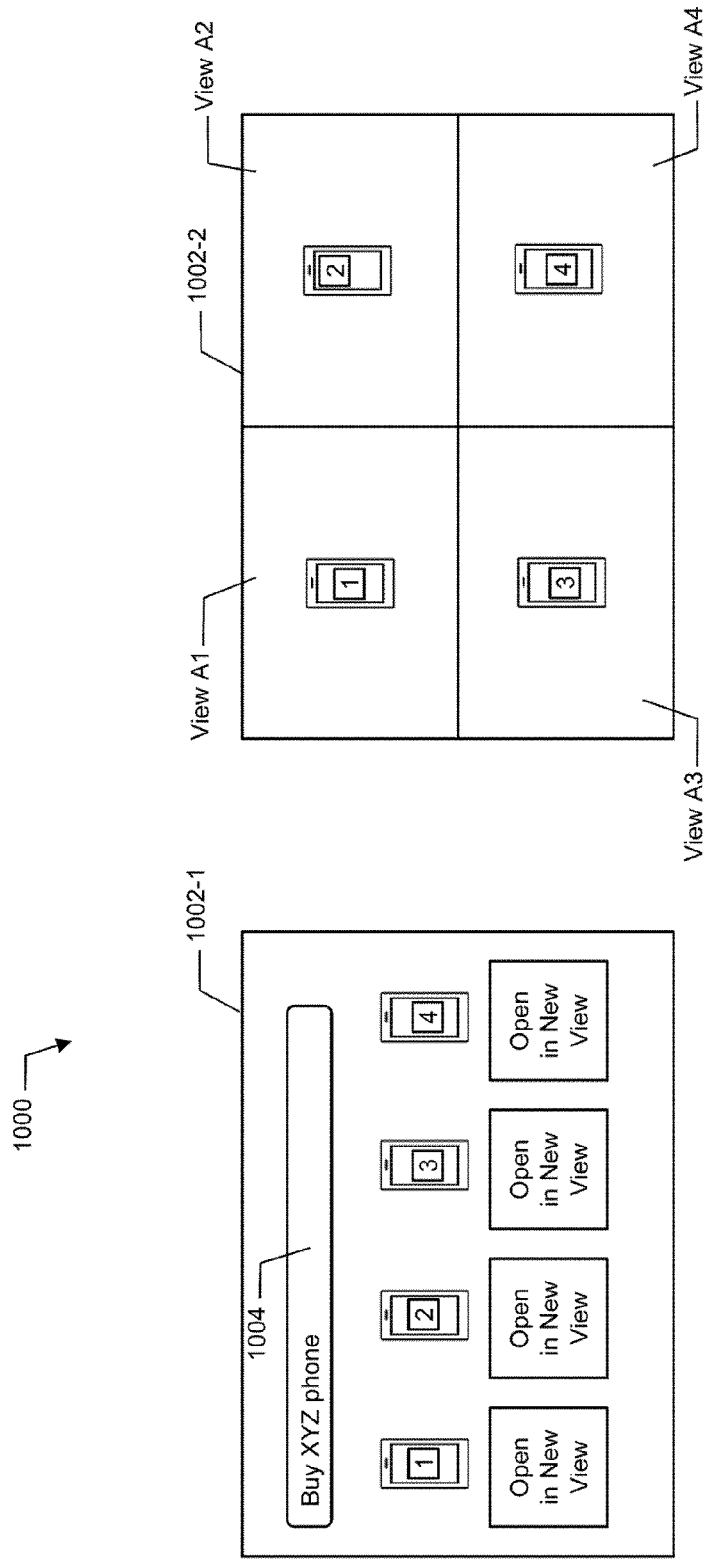
FIGS. 10, 11, and 12 illustrate applications of a method of displaying web pages according to embodiments of the disclosure.

FIG. 10 illustrates an application 1000 of a method of displaying web pages according to an embodiment. In the application 1000, a display 1002-2 is shown. The display 1002-1 may be a display of a tablet, or may be a monitor connected to a workstation computer. In an example, a user may seek to purchase a phone, and may accordingly enter a query to that end, in a search bar 1004. Accordingly, the user may be provided with results, as shown on the display 1002-1. Then, the user may seek to open each of one or more URLs in a fresh view for viewing, as shown in FIG. 10. Accordingly, in a display 1002-2, the URLs may be opened in views A1-A4. Herein, the views A1-A4 may be of same type, or different type, depending upon the URL that is being opened therein and other factors, as described herein. These views 1-4 may be displayed side by side, thereby providing the user with a greater comparison experience.

Figure 11:
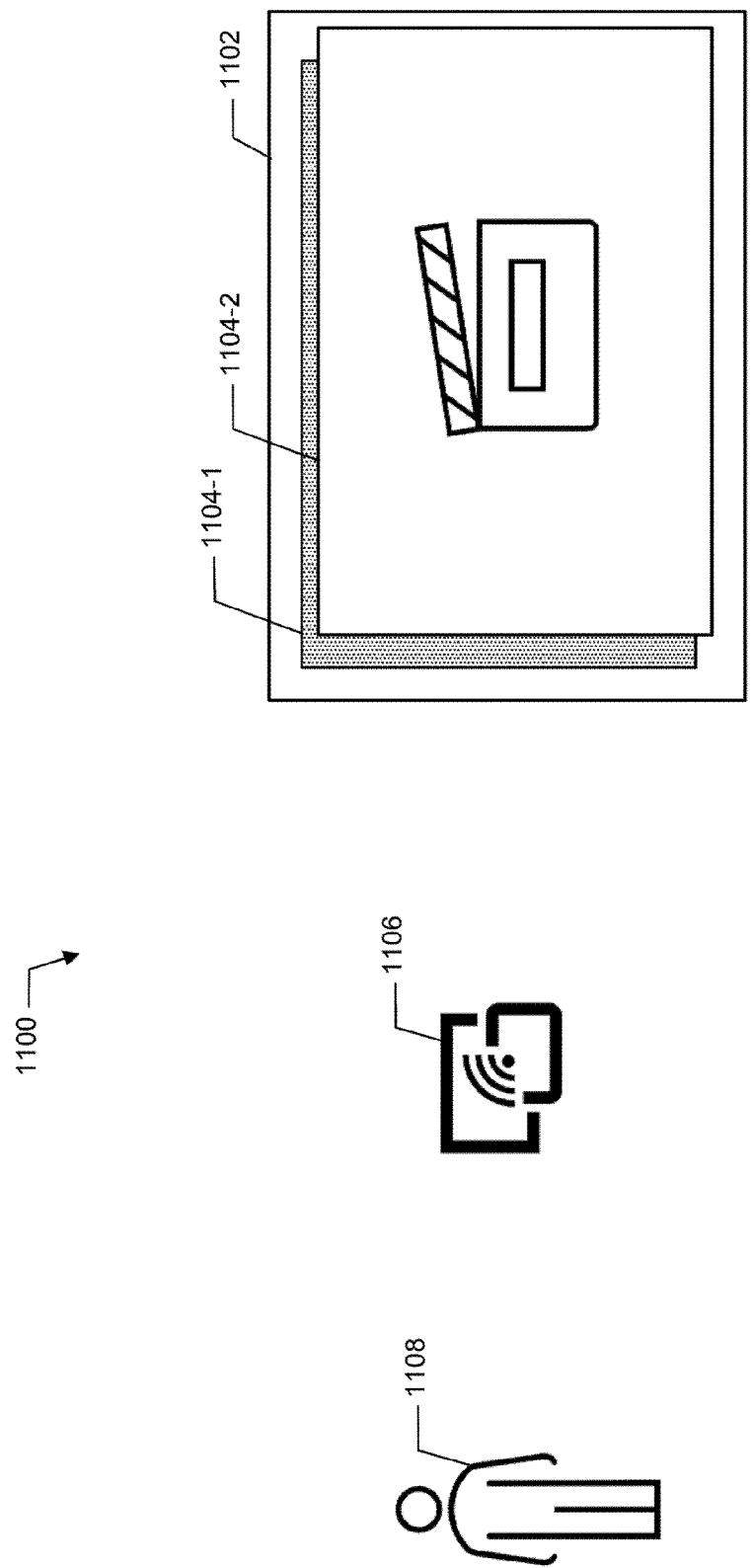

FIG. 11 illustrates an application 1100 of a method of displaying web pages, according to an embodiment. In the application 1100, a user 1108 may provide a voice input to a digital assistant 1106, to play a movie A. The digital assistant 1106 may be a computing device coupled to the Internet and user devices present in the same environment. Accordingly, the digital assistant 1106 may perform several operations. For example, the digital assistant 1106 may be configured to fetch results, information, multimedia, etc., from the internet, and provide to the user 1108 through a display interface and/or sound interface of the digital assistant 1106, or through one or more of the user devices. For example, the digital assistant 1106 may stream multimedia from internet through a TV and a speaker system.

In the application 1100, based on receiving a command to play the movie A, the digital assistant 1106 may attempt to open the movie A on a display 1102. The digital assistant 1106 may determine that the user account's for availing multimedia may need recharging. Accordingly, the digital assistant 1106 may open a secret view 1104-1 for making payments. Once the recharge is done, the digital assistant 1106 may open the movie A in a standard view 1104-2.

Figure 12:
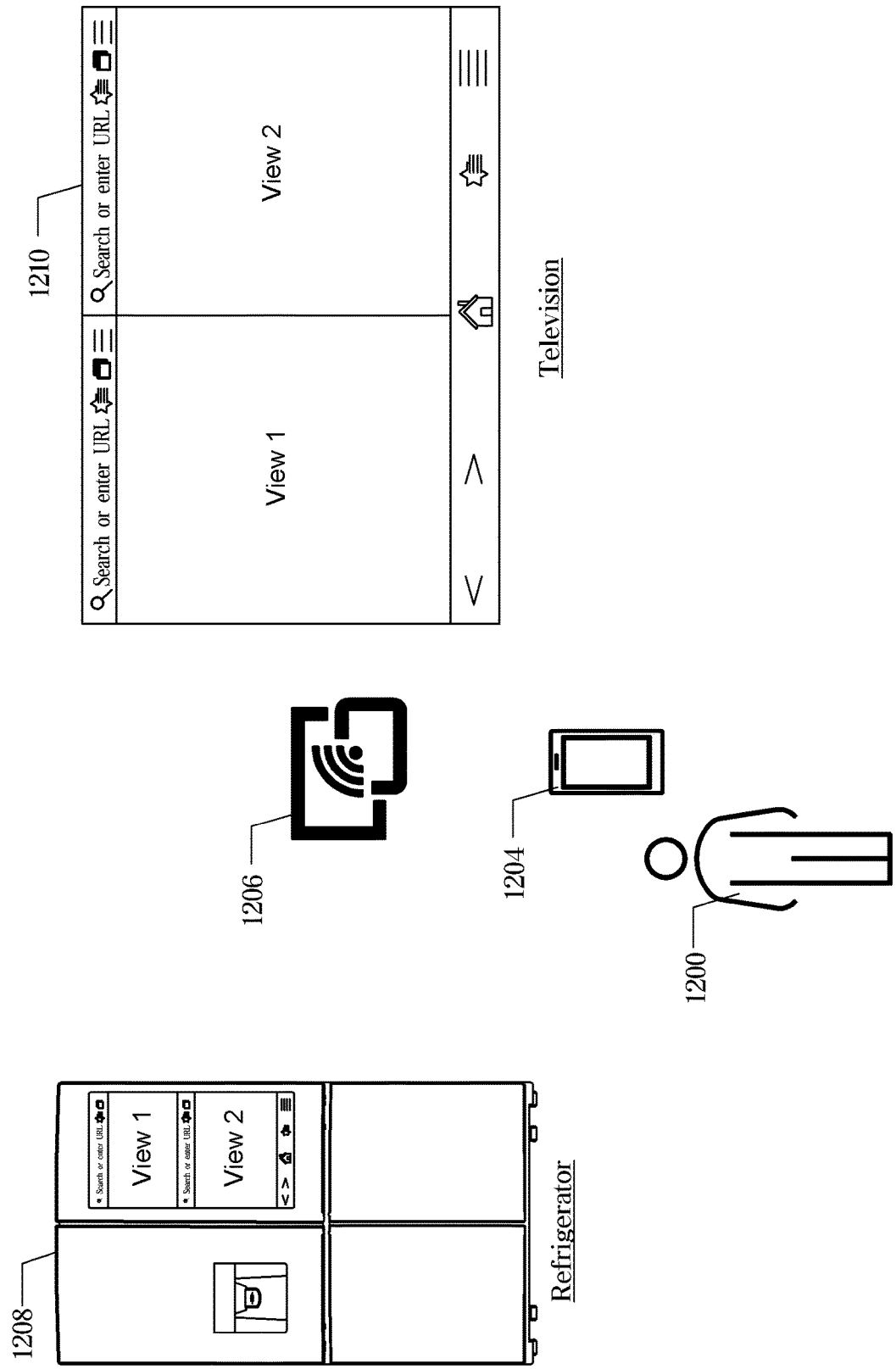

FIG. 12 illustrates an application 1200 of a method of displaying web pages, according to an embodiment. In the application 1200, a user 1200 may be viewing web content on a smartphone 1204. Suppose that the user 1200 has two views opened in the smartphone 1202. According to an embodiment, the user 1200 may cast the views onto connected devices or share the views with others via messaging apps. To that end, the smartphone 1204 may determine the connected devices using a gateway 1206. Subsequently, a list of connected devices may be presented to the user 1200, on a display of the smartphone 1204. The user 1200 may subsequently choose to cast the two views onto at least one device. For example, the user 1200 may choose to cast the content to a device 1208. In another example, the user 1200 may cast the content to a device 1210, for example, a TV. In an example, the user 1200 may cast the views to both the devices 1208 and 1210. In an example, the devices 1208 and 1210 may select the layout based on its own display screen size and may accordingly display the two views.

While specific language has been used to describe the disclosure, any limitations arising on account thereto, are not intended. As would be apparent to a person skilled in the art, various working modifications may be made to the method in order to implement the inventive concept as taught herein. The drawings and the foregoing description provide examples of embodiments. Those skilled in the art will appreciate that one or more of the described elements may well be combined into a single functional element. Alternatively, certain elements may be split into multiple functional elements. Elements from one embodiment may be added to another embodiment.

While the disclosure has been described with reference to embodiments thereof, it will be apparent to those of ordinary skill in the art that various changes and modifications may be made thereto without departing from the spirit and scope of the disclosure as set forth in the following claims and their equivalents.

What is claimed is:

1. A method of displaying web pages on a display of an electronic device, the method comprising:
   receiving a request from a user for opening a web page;
   determining a type, from among a plurality of types of web pages, of the web page to be opened based on metadata corresponding to the web page;
   automatically selecting, by using an intelligence engine, from among a plurality of views, a view in which the web page is to be opened, based on the determined type of the web page, by using pre-stored information about a mapping between the plurality of types of web pages and corresponding views, wherein the mapping is learned by the intelligence engine based on a browsing history and a browsing pattern of the user, wherein each view of the plurality of views has a corresponding set of viewing properties; and
   displaying the web page in a browser window based on the corresponding set of viewing properties of the selected view.

2. The method of claim 1, further comprising:
   accessing a personalization database comprising respective user personalization data corresponding to a plurality of web pages, the respective user personalization data including at least a user preference of a view for each of the plurality of web pages,
   wherein the selecting the view comprises selecting, based on user personalization data corresponding to the web page being included in the personalization database, the view based on the user preference included in the user personalization data corresponding to the web page.

3. The method of claim 1, further comprising:
   accessing a personalization database comprising respective user personalization data corresponding to a plurality of web pages, the respective user personalization data including at least a view preference setting; and
   based on the determining that user personalization data corresponding to the web page is included in the personalization database, modifying at least one viewing property associated with the browser window based on the view preference setting included in the user personalization data corresponding to the web page.

4. The method of claim 1, further comprising:
   grouping the browser window with another browser window in a same view, based on determining that the another browser window with the same view is currently opened on the display of the electronic device.

5. The method of claim 1, wherein the web page pertains to a first domain, and it is determined that another web page pertaining to the first domain is currently opened in another browser window,
   wherein the selecting the view comprises selecting, based on determining that the user has logged into the first domain using the another web page using a first user account, the view for the web page such that the selected view is different from a view selected for the another web page; and
   wherein the displaying the web page comprises opening the web page in the browser window in the selected view without using the first user account.

6. The method of claim 1, further comprising:
based on determining that at least one other browser window is opened on the display of the electronic device, determining whether it is possible to concurrently display the browser window and the at least one other browser window on the display of the electronic device, based on a size of the display and an orientation of the electronic device; and
displaying the browser window and the at least one other browser window concurrently on the display based on a predetermined layout, based on determining that it is possible to concurrently display the browser window and the at least one other browser window on the display of the electronic device.

7. The method of claim 1, further comprising:
displaying the web page in the browser window based on at least one view property associated with the selected view, based on determining that the at least one view property associated with the selected view contradicts with at least one property of the browser window.

8. A browser display system for displaying web pages on a display of an electronic device, the browser display system comprising:
a memory;
a processor coupled to the memory; and
at least one engine coupled to the processor, wherein the at least one engine is configured to:
receive, from a user, a request for opening a web page in a browser application;
determine a type, from among a plurality of types of web pages, of the web page to be opened based on metadata corresponding to the web page;
automatically select, by using an intelligence engine, from among a plurality of views, a view in which the web page is to be opened, based on the determined type of the web page, by using pre-stored information about a mapping between the plurality of types of web pages and corresponding views, wherein the mapping is learned by the intelligence engine based on a browsing history and a browsing pattern of the user, and wherein each view of the plurality of views has a corresponding set of viewing properties; and
display the web page in a browser window of the browser application based on the corresponding set of viewing properties of the selected view.

9. The browser display system of claim 8, wherein the at least one engine is further configured to:
access a personalization database comprising respective user personalization data corresponding to a plurality of web pages, the respective user personalization data including at least a user preference of a view for each of the plurality of web pages; and
select the view based on the user preference included in the user personalization data, based on the user personalization data corresponding to the web page being included in the personalization database.

10. The browser display system of claim 8, wherein the at least one engine is further configured to:
access a personalization database comprising respective user personalization data corresponding to a plurality of web pages, the respective user personalization data including at least a view preference setting; and
based on user personalization data corresponding to the web page being included in the personalization database, modify one or more viewing properties associated with the browser window based on the view preference setting included in the user personalization data corresponding to the web page.

11. The browser display system of claim 8, wherein the at least one engine is further configured to:
group the browser window with another browser window in a same view, based on determining that the another browser window with the same view is opened on the display of the electronic device.

12. The browser display system of claim 8, wherein the web page pertains to a first domain, and it is determined that another web page pertaining to the first domain is currently opened in another browser window, and
wherein the at least one engine is further configured to:
select, based on determining that the user has logged into the first domain using the another web page using a first user account, the view for the web page such that the selected view is different from a view selected for the another web page; and
open the web page in the browser window in the selected view without using the first user account.

13. The browser display system of claim 8, wherein the at least one engine is further configured to:
determine that at least one other browser window is opened on the display of the electronic device, and determine whether it is possible to concurrently display the browser window and the at least one other browser window on the display of the electronic device, based on a size of the display and an orientation of the electronic device; and
display the browser window and the at least one other browser window concurrently on the display based on a predetermined layout, based on determining that it is possible to concurrently display the browser window and the at least one other browser window on the display of the electronic device.

14. The browser display system of claim 8, wherein the at least one engine is further configured to:
displaying the web page in the browser window based on at least one view property associated with the selected view, based on determining that the at least one view property associated with the selected view contradicts with at least one property of the browser window.

15. The browser display system of claim 8, wherein the at least one engine is further configured to:
monitor, over time, the browsing history and the browsing pattern of the user;
create a database with a correlation of the monitored browsing history and pattern of browsing;
analyze a layout of the electronic device with reference to multiple corresponding views available in the database for the web page; and
select a view for displaying the web page that matches with the layout of the electronic device.

* * * * *